(12) United States Patent
Baek et al.

(10) Patent No.: US 10,887,438 B2
(45) Date of Patent: Jan. 5, 2021

(54) ELECTRONIC DEVICE INCLUDING SYSTEM FOR EXTENDING AND RETRACTING FLEXIBLE DISPLAY

(71) Applicant: SAMSUNG ELECTRONICS CO., LTD., Suwon-si (KR)

(72) Inventors: Moohyun Baek, Suwon-si (KR); Dongryul Shin, Suwon-si (KR); Shinho Yoon, Suwon-si (KR); Youngsoo Chun, Suwon-si (KR); Byounguk Yoon, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/281,356

(22) Filed: Feb. 21, 2019

(65) Prior Publication Data

US 2019/0268455 A1    Aug. 29, 2019

(30) Foreign Application Priority Data

Feb. 23, 2018    (KR) .................. 10-2018-0021794

(51) Int. Cl.
*H04M 1/02* (2006.01)
*G06F 1/16* (2006.01)
*G06F 3/041* (2006.01)

(52) U.S. Cl.
CPC ........ *H04M 1/0268* (2013.01); *G06F 1/1652* (2013.01); *G06F 1/1681* (2013.01);
(Continued)

(58) Field of Classification Search
CPC .... G06F 1/1624; G06F 1/1652; G06F 1/1681; G06F 1/1683; G06F 1/1684;
(Continued)

(56) References Cited

U.S. PATENT DOCUMENTS 9,811,119 B2    11/2017 Seo
2012/0307472 A1    12/2012 Bohn et al.
(Continued)

OTHER PUBLICATIONS

Search Report and Written Opinion dated May 24, 2019 in counterpart International Patent Application No. PCT/KR2019/001969.

*Primary Examiner* — Ryan A Lubit
(74) *Attorney, Agent, or Firm* — Nixon & Vanderhye P.C.

(57) ABSTRACT

An electronic device may include an assembly that enables varying a visible portion of a display by extending and retracting a bendable portion of the display. The extending and retracting of the bendable display is facilitated by a first assembly on which a substantially planar visible portion of the display is disposed and a second assembly slidably attached to the first assembly. A space is defined by the first and second assemblies in which a bent portion of the display is housed. When the first assembly is extended (e.g., opened) with respect to the second assembly, at least a portion of the bent portion of the display is extended so as to be visible, and when the first assembly is closed (e.g., retracted) with respect to the second assembly, the extended bent portion of the display is retracted into the space between the first assembly and the second assembly, and is no longer visible. Various constructions of the first and second assemblies and corresponding structures are provided.

20 Claims, 31 Drawing Sheets

(52) U.S. Cl.
CPC .......... *G06F 1/1683* (2013.01); *G06F 3/0412* (2013.01); *G06F 2203/04102* (2013.01)

(58) Field of Classification Search
CPC ........ G06F 3/0412; G06F 2203/04102; H04M 1/0268; H04M 1/0237
See application file for complete search history.

(56) References Cited

U.S. PATENT DOCUMENTS

| | | | |
|---|---|---|---|
| 2012/0314400 A1* | 12/2012 | Bohn | H01L 51/5237 362/97.1 |
| 2013/0058063 A1* | 3/2013 | O'Brien | G06F 1/1652 361/807 |
| 2014/0213324 A1* | 7/2014 | Tan | G06F 1/1677 455/566 |
| 2014/0380186 A1* | 12/2014 | Kim | G06F 1/1652 715/746 |
| 2015/0153780 A1 | 6/2015 | Maatta et al. | |
| 2017/0013729 A1 | 1/2017 | Rothkopf et al. | |
| 2017/0140504 A1 | 5/2017 | Jeong et al. | |
| 2017/0169741 A1 | 6/2017 | Lim | |
| 2017/0286042 A1* | 10/2017 | Lee | G06F 3/14 |
| 2017/0364119 A1* | 12/2017 | Lee | G06F 1/1652 |
| 2018/0343330 A1* | 11/2018 | Lin | H04M 1/0268 |
| 2019/0032380 A1* | 1/2019 | Wu | G06F 1/1652 |

\* cited by examiner

ELECTRONIC DEVICE INCLUDING SYSTEM FOR EXTENDING AND RETRACTING FLEXIBLE DISPLAY

CROSS REFERENCE TO RELATED APPLICATION

This application is based on and claims priority under 35 U.S.C. § 119 to Korean Patent Application No. 10-2018-0021794, filed on Feb. 23, 2018, in the Korean Intellectual Property Office, the disclosure of which is incorporated by reference herein in its entirety.

BACKGROUND

Field

The present disclosure relates to an electronic device including a movable flexible display.

Description of Related Art

Recently, with a significant decrease in a technological gap of each manufacturer, electronic devices have become slimmer to satisfy purchasing needs of consumers and have been developed to improve convenience of use. The electronic device increases in a size of a display region to display a more variety of content. For example, since the electronic device has become smaller and slimmer, a technique for securing a display region having a large screen is developed.

In general, portable electronic devices have been advanced in various forms to ensure a more extended display region without affecting portability. For example, the electronic device may be a slide type electronic device in which a first construction and a second construction are open in a sliding manner with respect to each other when used in a position at which the first and second constructions overlap or a foldable type electronic device in which a first construction and a second construction are disposed in an overlapping or unfolded manner. However, since the electronic devices are disposed in such a manner that the first construction and the second construction are moved with respect to each other, a freedom degree of mounting an electronic component (e.g., an antenna) is limited, which may lead to an increase in total volume of the electronic device. In addition, since the first construction and the second construction are installed movably with respect to each other, performance of internal electronic components may deteriorate due to a frequent movement.

SUMMARY

According to various embodiments of the present disclosure, it is possible to provide an electronic device including a movable flexible display.

According to various embodiments, it is possible to provide an electronic device including a movable flexible display capable of contributing to making the electronic device slim while increasing a degree of freedom of mounting an electronic component.

According to various embodiments, it is possible to provide an electronic device including a movable flexible display for ensuring performance of an electronic component disposed inside the electronic device.

According to various example embodiments, an electronic device may include: a first assembly including a first plate having a first face and a second face facing away from the first face; a second assembly including a second plate facing the second face of the first plate, a first lateral wall extending from a first end portion of the second plate, a second lateral wall extending from the first lateral wall and the second plate, and a third lateral wall extending from the first lateral wall and the second plate and parallel to the second lateral wall, wherein the second plate, the first lateral wall, the second lateral wall, and the third lateral wall together define a trough, one side of the trough being open to accommodate at least part of the first assembly, wherein the first assembly is movable between an open state and a closed state with respect to the second assembly in a first direction with respect to the second plate, and wherein the second assembly is located at a first distance from the first lateral wall when the first assembly is in the closed state, and the second assembly is located at a second distance greater than the first distance from the first lateral wall when the first construction is in the open state; and a flexible touchscreen display. The flexible touchscreen display may include a planar portion extending across at least part of the first face and mounted to the first face, and a bendable portion extending to a space between the first lateral wall and the first assembly from the planar portion or between the second plate and the second face of the first plate when the first assembly is in the closed state. When the first assembly transitions from the closed state to the open state, at least part of the bendable portion extending to the space may be moved to be visually exposed to the outside of the electronic device from the space to substantially define a plane between the planar portion and the first lateral wall. When the first assembly is in the closed state, the bendable portion may be bent along an axis extending in a second direction perpendicular to the first direction, a first portion of the bendable portion being inserted to a corresponding region of the space between the second plate and the second face of the first plate, and a second portion of the bendable portion being located between the axis and the second plate. A third distance between the second plate and the first portion may be greater than a fourth distance between the second plate and the second portion.

According to various embodiments, an electronic device may include a first assembly comprising at least part of a rear face of the electronic device, a second assembly at least partially accommodated by the first assembly and movable with respect to the rear face, and a flexible touchscreen display at least partially accommodated by the first assembly, and coupled to the second assembly so that a size of a display region visually exposed to the outside in a direction of a front face of the electronic device is adjustable in response to a movement of the second assembly. The flexible touchscreen display may include a flat display region always visually exposed to the outside, and a bendable display region exposed visually to the outside by being extended from an inner space defined by the first assembly when the second assembly is moved in a first direction, and not exposed visually by being retracted to the inner space when the second assembly is moved in a second direction opposite to the first direction. A first portion of the bendable display region may be substantially parallel to the flat display region. When the second portion is retracted to the inner space so as to be bent with respect to the flat display region, a first distance between the first portion and an interior surface of the rear face may be greater than a second distance between the second portion and the interior surface.

According to various example embodiments of the present disclosure, an electronic device may include a flexible display which is movable (e.g., rollable or slidable) to extend or reduce a display region visually exposed to the outside. If the flexible display is moved (e.g., rolled or slided), a shape of at least part thereof may be transformed (e.g., bended). Since an electronic component (e.g., an antenna, an antenna contact component, a Printed Circuit Board (PCB), a Flexible Printed Circuit Board (FPCB), a connector, or a lighting device) is disposed around the display region, the electronic component may be mounted with an improved degree of freedom, and may be slim in size. In addition to having a slim size, performance of the electronic component can be ensured.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
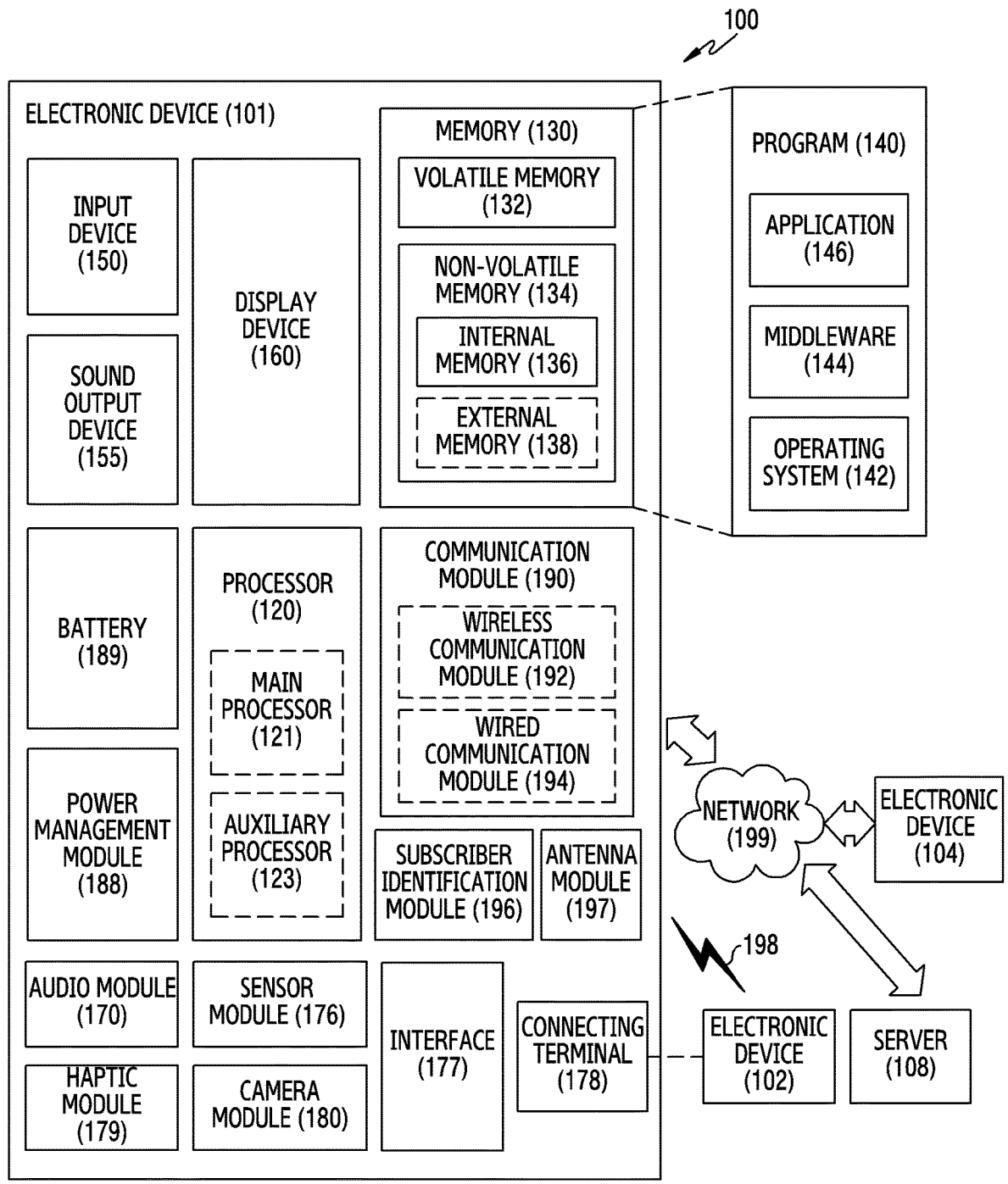
FIG. 1 is a block diagram illustrating an electronic device in a network environment including a movable flexible display according to various embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" may refer, for example, to a storage medium that is a tangible device. This term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
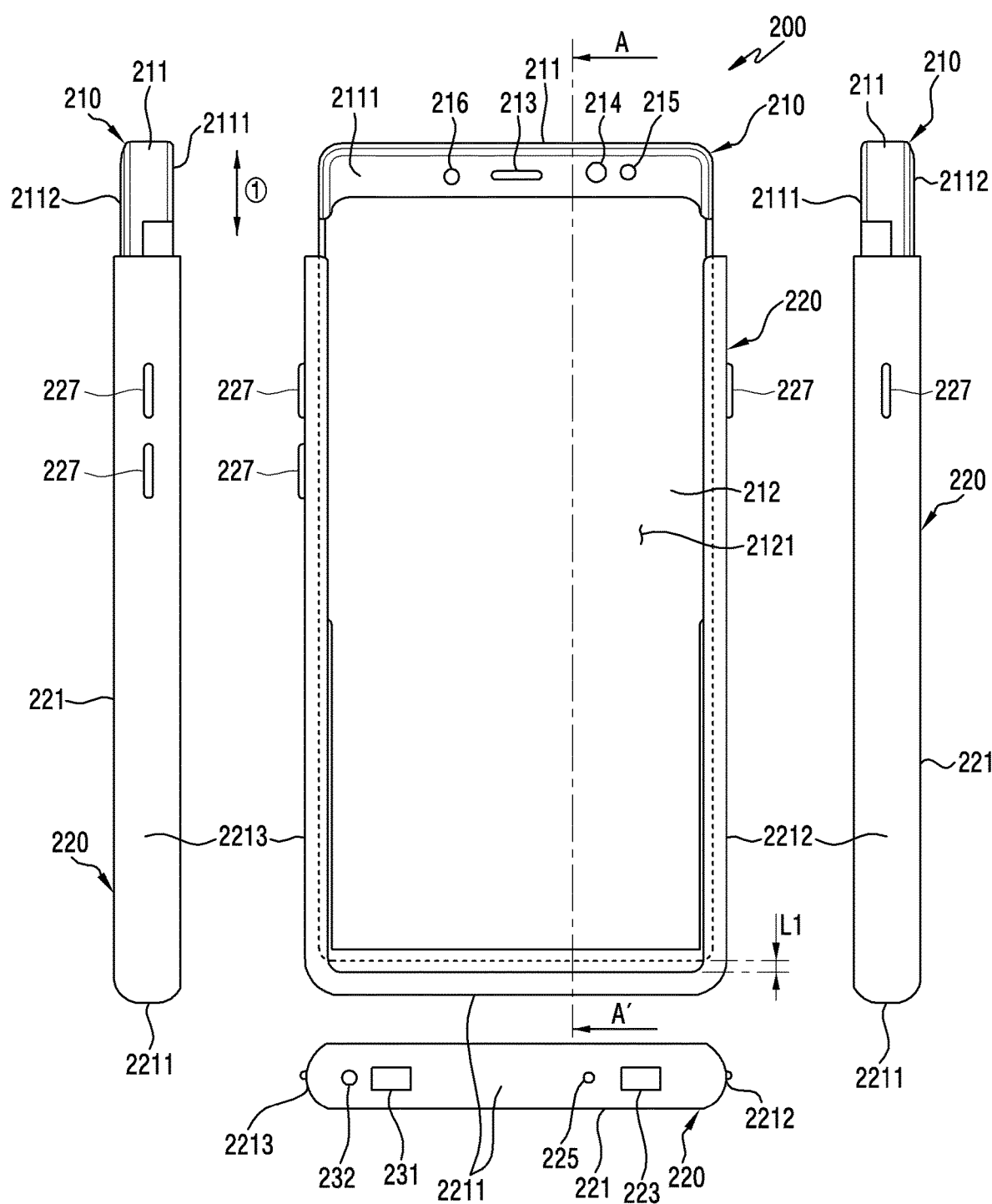
FIG. 2A and FIG. 2B are diagrams illustrating a front face and rear face of an electronic device according to various embodiments of the present disclosure.
Figure 2B:
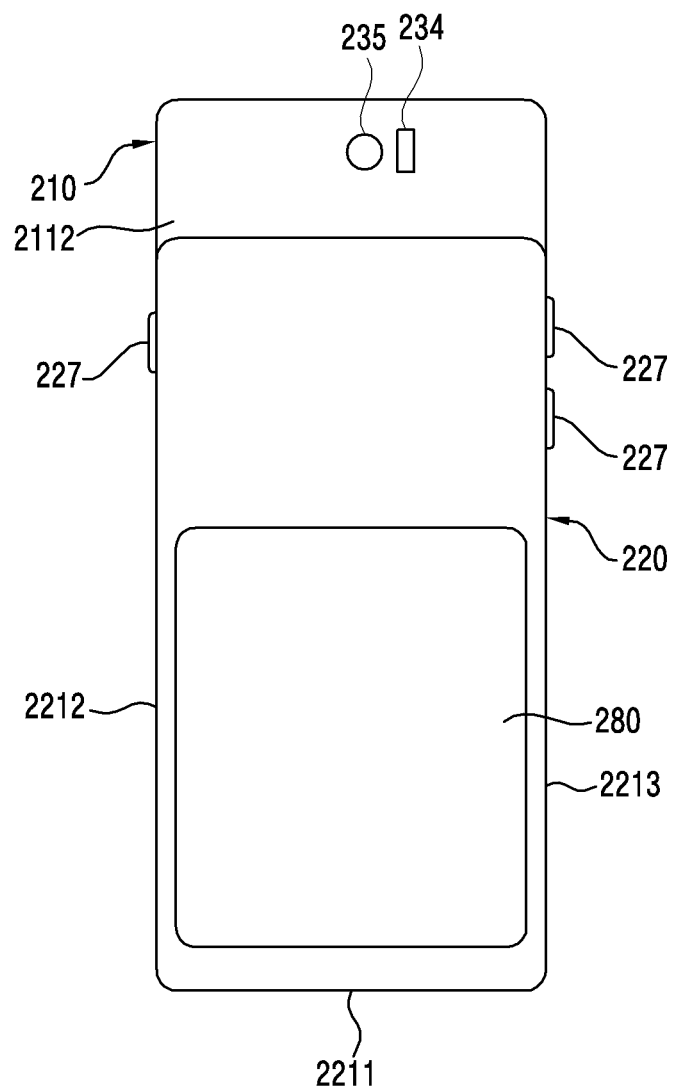
Figure 3:
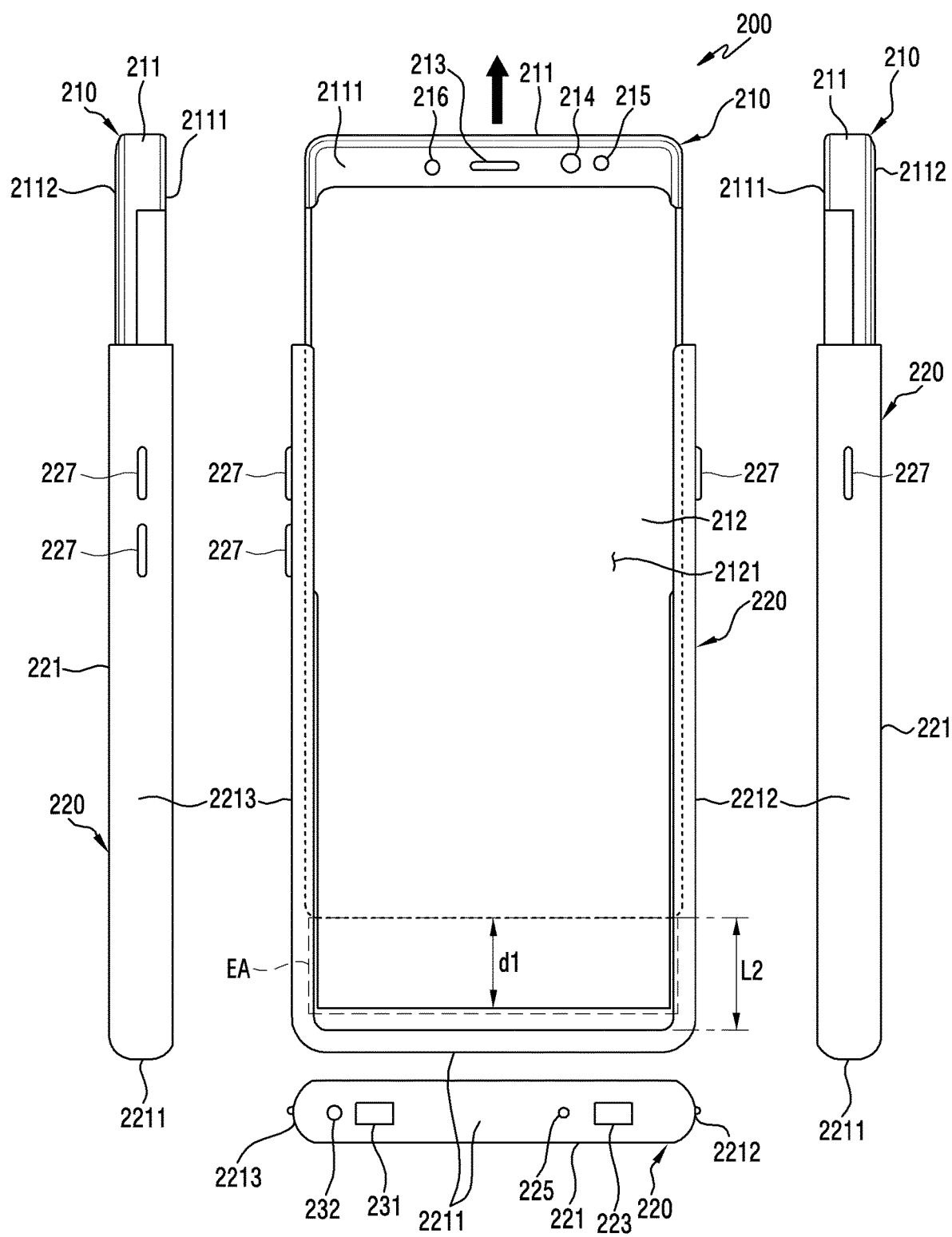
FIG. 3 is a diagram illustrating an example state in which the electronic device of FIG. 2A is extended according to various embodiments of the present disclosure.

FIG. 2A an FIG. 2B are diagrams illustrating a front face and rear face, respectively, of an example electronic device 200 including a movable display 212 according to various embodiments of the present disclosure. FIG. 3 is a diagram illustrating an example state where the electronic device 200 of FIG. 2A is extended according to various embodiments of the present disclosure.

The electronic device 200 of FIG. 2A to FIG. 3 may be at least partially similar to the electronic device 101 of FIG. 1, or may include other embodiments of the electronic device.

FIG. 2A illustrates a state where a first construction (the terms "assembly" and the term "construction" may be used interchangeably in the present disclosure) 210 is closed with respect to a second construction (assembly) 220, and FIG. 3 illustrates a state where the first construction (assembly) 210 is open with respect to the second construction (assembly) 220. In the closed state, a region visually exposed to the outside of the electronic device 200 from a display region of a display 212 may, for example, have a first size (e.g., length or width). In the open state, a region visually exposed to the outside of the electronic device 200 from the display region of the display 212 may, for example, have a second size (e.g., length or width) different from the first size (e.g., greater than the first size).

Referring to FIG. 2A and FIG. 2B, the electronic device 200 may include the first construction (assembly) 210 and the second construction (assembly) 220 movably disposed with respect to the first construction (assembly) 210. According to an embodiment, a first plate 211 of the first construction 210 may include a first face 2111 (e.g., a front face) and a second face 2112 (e.g., a rear face) facing away from the first face 2111. According to an embodiment, the second construction 220 may include a second plate 221, a first lateral wall 2211 extending from the second plate 221, a second lateral wall 2212 extending from the second plate 221 and the first lateral wall 2211, a third lateral wall 2213 extending from the first lateral wall 2211 and the second plate 221 and parallel to the second lateral wall 2212, or a second rear plate 280 (e.g., a rear window). According to an embodiment, the second plate 221, the first lateral wall 2211, the second lateral wall 2212, and the third lateral wall 2213 may be constructed such that one side thereof is open to accommodate at least part of the first construction (assembly) 210. According to an embodiment, the second lateral wall 2212 or the third lateral wall 2213 may be omitted. According to an embodiment, the second plate 221, the first lateral wall 2211, the second lateral wall 2212, and/or the third lateral wall 2213 may be manufactured as an integral construction (assembly). For another example, the second plate 221, the first lateral wall 2211, the second lateral wall 2212, or the third lateral wall 2213 may be combined by being formed or manufactured as separate constructions (assemblies). According to an embodiment, the second rear plate 280 may cover at least part of the display 212.

According to various embodiments, the electronic device 200 may include, for example, and without limitation, at least one of the display 212, audio modules 213, 223, and 225, camera modules 215 and 235, an indicator 216 (e.g., LED device), sensor modules 214 and 234, connector holes 231 and 232, and the like.

According to various embodiments, the display 212 may include a planar portion 2121 extending across at least part of the first face 2111 and disposed to the first face 2111 and a bendable portion extending to a space between the first lateral wall 2211 and the first construction (assembly) 210 from the planer portion 2121 in a closed state. According to an embodiment, when viewed from above the first plate 211, if the first construction (assembly) 210 is moved from the closed state to the open state, at least part of the bendable portion of the display may be configured to move by a specific display region EA in a direction of the planar portion to substantially provide a plane between the planar portion 2121 and the first lateral wall 2211. The display 212 may, for example, and without limitation, be disposed adjacent to and/or bonded to a touch sensing circuit, a pressure sensor capable of measuring touch strength (pressure), a digitizer for detecting a stylus pen of a magnetic field type, or the like.

According to various embodiments, the audio modules 213, 223, and 225 may include the speaker holes 213 and 223 and/or the microphone hole 225. The speaker holes 213 and 223 may include the receiver hole 213 and/or the external speaker hole 223. The microphone hole 225 may have a microphone disposed inside thereof to acquire external sound, and in some embodiments, may have a plurality of microphones disposed to sense a sound direction. In some embodiments, the speaker holes 213 and 223 and the microphone hole 225 may be implemented with one hole, or a speaker (e.g., a Piezo speaker) may be included without the speaker holes 213 and 223. According to an embodiment, the receiver hole 213 may be disposed to the first construction (assembly) 210, and the external speaker hole 223 or the microphone hole 225 may be disposed to the second construction (assembly) 220. According to another embodiment, the external speaker hole 223 may be disposed to the second face 2112 of the first plate 211 or the lateral face of the first construction (assembly) 210. According to another embodiment, the microphone 225 may be disposed to the lateral face of the first construction (assembly) 210.

According to various embodiments, the sensor modules 214 and 234 may generate an electrical signal and/or data value corresponding to an internal operating state of the electronic device 200 and/or an external environmental state. The sensor modules 214 and 234 may include, for example, the first sensor module 214 (e.g., a proximity sensor) disposed to the first face 2111 of the first plate 211 and/or a second sensor module (not shown) (e.g., a fingerprint sensor) disposed to the second face 2112 of the first plate 211 and/or the third sensor module 234 (e.g., an HRM sensor). The electronic device 200 may further include at least one of a sensor module (not shown), for example, and without limitation, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, an illumination sensor, or the like.

According to various embodiments, the camera modules 215 and 235 may include a first camera device disposed to the first face 2111 of the first plate 211 and the second camera device 235 disposed to the second face 2112. The first camera device 215 or the second camera device 235 may include, for example, and without limitation, one or more lenses, an image sensor, and/or an image signal processor. According to an embodiment, the second camera device 235 may be disposed to one face of the second construction 220.

According to various embodiments, a key input device 227 may be disposed to the second lateral wall 2212 and/or third lateral wall 2213 of the second construction 220. The electronic device 220 may include a key input device (not shown), such as, for example, and without limitation, a home button key and/or a touch pad disposed around the home key button. According to another embodiment, at least part of the key input device 227 may be located in one region of the first construction 210.

According to various embodiments, the indicator 216 may be disposed to the first face 2111 of the first plate 211. The indicator 216 may provide, for example, and without limitation, state information of the electronic device 200 in an optical form, and may include an LED.

According to various embodiments, the connector holes 231 and 232 may, for example, include the first connector hole 231 capable of accommodating a connector (e.g., a USB connector) for transmitting/receiving power and/or data with respect to an external electronic device and the second connector hole (or earphone jack) 232 capable of accommodating a connector for transmitting/receiving an audio signal with respect to the external electronic device. According to an embodiment, the first connector hole 231 and/or the second connector hole 232 may be disposed to the first lateral wall 2211 of the second construction (assembly) 220. According to another embodiment, the first connector hole 231 and/or the second connector hole 232 may be disposed to the lateral wall of the first construction 210.

According to various embodiments, the rear window 280 may be disposed to the first face 2112 of the electronic device 200 and may be disposed such that the display 212 and the extended bendable portion are at least partially exposed to the outside. According to an embodiment, the rear window 280 may be disposed to the second construction (assembly) 220.

Referring to FIG. 3, the first construction 210 may be disposed to be reciprocally movable by a specific distance dl with respect to the second construction 220. According to an embodiment, the display 212 may have an extended region EA of an extended display due to an extension of the first construction 210. According to an embodiment, the first construction 210 is movable in an open state or closed state with respect to the second construction 220 in a first direction (e.g., a direction ① of FIG. 2A) parallel to the second plate 221 and the second lateral wall 2212, and thus the first construction 210 may be moved so as to be placed at a first distance (e.g., a first distance L1 of FIG. 2A) from the first lateral wall 2211 in a closed state, and to be placed at a second distance L2 greater than the first distance from the first lateral wall 2211 in an open state FIG. 4 is an exploded perspective view illustrating an example electronic device 400 according to various embodiments of the present disclosure.

Figure 4:
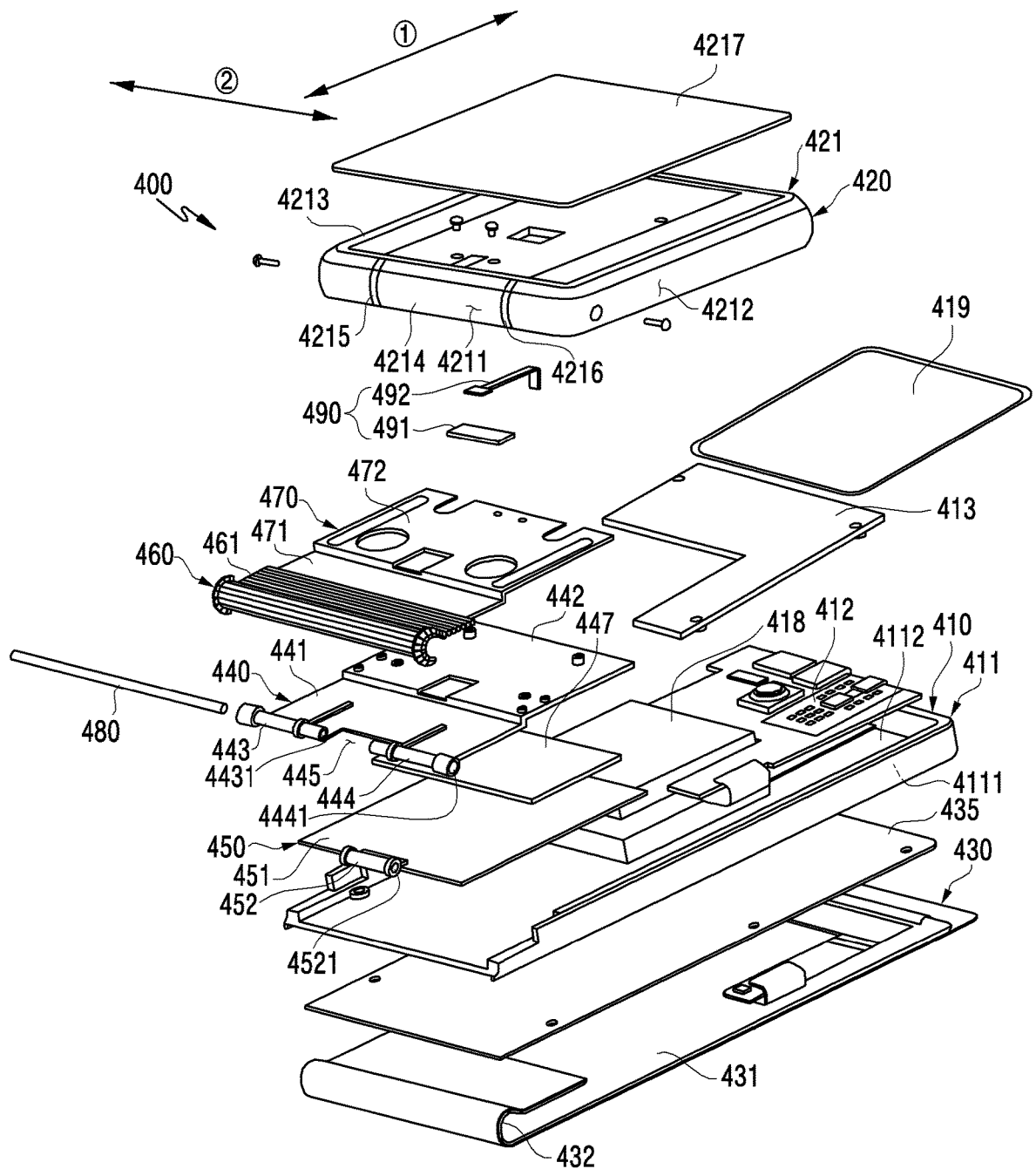
FIG. 4 is an exploded perspective view illustrating an example electronic device according to various embodiments of the present disclosure.

The electronic device 400 of FIG. 4 may be at least partially similar to the electronic device 101 of FIG. 1 or the electronic device 200 of FIG. 2A to FIG. 3, and/or may include other embodiments of the electronic device 400.

Referring to FIG. 4, the electronic device 400 may include a first construction 410 including a first plate 411 having a first face 4111 facing a display 430 and a second face 4112 facing away from the first face 4111. According to an embodiment, the electronic device 400 may include a second construction 420 including a second plate 421 facing the second face 4112 of the first plate 411, a first lateral wall 4211 extending from the second plate 421, a second lateral wall 4212 extending from the first lateral wall 4211 and the second plate 421, and a third lateral wall 4213 extending from the first lateral wall 4211 and the second plate 421 and parallel to the second lateral wall 4212. According to an embodiment, the second plate 421, the first lateral wall 4211, the second lateral wall 4212, and/or the third lateral wall 4213 may be constructed in an integrated or combined manner. According to an embodiment, the electronic device 400 may include the display 430 (e.g., the display 212 of FIG. 2A) disposed to the first face 4111 of the first plate 411 and provided at least partially in a space between the second plate 421 and the second face 4112 of the first plate 411 via the first lateral wall 4211. According to an embodiment, the electronic device 400 may include a supporting construction 460 for coupling the first plate 411 and the second plate 421 in a slidable manner and for guiding a movement of the display 430 disposed via the first lateral wall 4211.

According to various embodiments, the first construction 410 may be movable in an open state and a closed state with respect to the second construction 420 in a first direction (e.g., a direction ①) parallel to the second plate 421 and the second lateral wall 4212, and thus may be placed at a first distance from the first lateral wall 4211 when the first construction 410 is in the closed state, and may be placed at a second distance longer than the first distance from the first lateral wall 4211 in the open state.

According to various embodiments, the display 430 may include a planar portion 431 extending across at least part of the first face 4111 of the first plate 411 such that the extended portion is disposed to the first face 4111 of the first plate 411, and a bendable portion 432 extending to a space between the first lateral wall 4211 and the first construction 410 from the planar portion 431 in a closed state. According to an embodiment, when viewed from above the first plate 411, if the first construction 410 is moved from the closed state to the open state, the display 430 may be moved by a specific amount from a space between the first lateral wall 4211 and the first construction 410 to substantially define a plane between the planar portion 431 and the first lateral wall 4211.

According to various embodiments, the first construction 410 may include a battery 418 mounted to the second face 4112 of the first plate 411. According to an embodiment, the first construction 410 may include a PCB 412 (e.g., a main board) mounted to the second face 4112. According to an embodiment, the PCB 412 and battery 418 disposed to the second face 4112 may be protected by the supporting cover 412 mounted to an upper portion thereof. According to an embodiment, at least part of the second face 4112, including the supporting cover 413, may be disposed to be protected by the first rear cover 419. According to an embodiment, the first rear cover 419 may be constructed of various materials such as metal, synthetic resin, or glass. According to an embodiment, the electronic device 400 may include a front supporting member (support) 435 disposed between the first face 4111 of the first plate 411 and the planar portion 431 of the display 430 to support the planar portion 431 of the display 430. According to an embodiment, the front supporting member 435 may be attached to the first face 4111 by means of, for example, and without limitation, screwing, boding, taping, or the like.

According to various embodiments, the second construction 420 may include the second plate 421. According to an embodiment, the second plate 421 may be comprised of at least one material, and at least one region thereof differs from the remaining other regions. For example, a first region of the second plate 421 may be of a first material, and a second region of the second plate 421 may be of a second material. In another embodiment, the second plate 421 may be provided in such a manner that a conductive member and a non-conductive member are insert-injected. According to an embodiment, the first lateral wall 4211 of the second plate 421 may be comprised of a conductive member. According to an embodiment, the first lateral wall 4211 may include a conductive unit lateral wall 4214 electrically decoupled from a neighboring conductive member due to a first non-conductive portion 4215 and/or second non-conductive portion 4216 disposed to be spaced apart by a specific interval. According to an embodiment, the conductive unit lateral wall 4214 may operate as an antenna radiator by being electrically coupled to a wireless communication circuit of the PCB 412 disposed inside the electronic device. However, without being limited thereto, at least part of the second lateral wall 4212 and/or third lateral wall 4213 of the second construction 410 may be used as an antenna radiator. According to various embodiments, a second rear cover 4217 is disposed to an exterior surface of the second plate 421 to provide at least part of an exterior of the electronic device. According to an embodiment, the second rear cover 4217 may be comprised of various materials such as, for example, and without limitation, metal, synthetic resin, glass, or the like.

According to various embodiments, the electronic device 400 may include a first supporting member (support) 440 and second supporting member (support) 450 disposed to a space between the second plate 421 and the first face 4111 of the first plate 411. According to an embodiment, the first supporting member 440 may include a first planer portion 441 and a second planar portion 442 extending to have a step difference with respect to a height of the first planar portion 441. According to an embodiment, the first supporting member 440 may include a pair of side hinge arms 443 and 444 disposed to have a constant interval from one end of the first planar portion 441. According to an embodiment, the pair of side hinge arms 443 and 444 may be disposed to have a length in a direction (e.g., a direction (P)) perpendicular to the second lateral wall 4212 and parallel to the first lateral wall 4211, and may include a first through-hole 4431 and a second through-hole 4441. According to an embodiment, the second supporting member 450 may include a third planar portion 451 having an area corresponding to at least the first planar portion 441 and second planar portion 442 of the first supporting member 440. According to an embodiment, the second supporting member 450 may include a center hinge arm 452 extending from the second planar portion 442 so as to be inserted to a space 445 between the pair of hinge arms 443 and 444 of the first supporting member 440. According to an embodiment, the center hinge arm 452 may include a third through-hole 4521. According to an embodiment, the first supporting member 440 and the second supporting member 450 may be mutually fixed by a shaft 480 disposed to penetrate both the first through-hole 4431 of the pair of side hinge arms 443 and 444 and the third through-hole 4521 of the sensor hinge arm 452, in a state where the pair of side hinge arms 443 and 444 and the sensor hinge arm 452 are coupled temporarily.

According to various embodiments, the second planar portion 442 of the first supporting member 440 may have a step difference and be closer to the second plate 421 than the first planar portion 441. For example, when the first supporting member 440 and the second supporting member 450 are coupled by the shaft 480, a space may be provided between the second planar portion 442 of the first supporting member 440 and the third planar portion 451 of the second supporting member 450. According to an embodiment, a sub PCB 447 may be disposed to the space. According to an embodiment, the sub PCB 447 may be electrically coupled, for example, and without limitation, to at least one conductive construction 490 (e.g., an antenna module, a microphone module, a speaker module, an interface connector port, a variety of sockets, an ear-jack assembly, or the like) disposed to the second construction 420. According to an embodiment, the conductive construction 490 may include a dummy portion 491 disposed to the second plate 421 and/or a conductive coupling member 492 (e.g., FPCB) to be electrically coupled to the sub PCB 447 by being coupled from the dummy portion 491. According to an embodiment, the conductive construction 490 may be electrically coupled to the second construction 420 using an additional electrical coupling member (e.g., a screw, a shaft, or the like). According to an embodiment, the sub PCB 447 may be electrically coupled to the PCB 412 disposed to the first construction 410 via an electrical coupling member (e.g., the electrical coupling member 4471 of FIG. 5) having a bendable property. For example, the conductive construction 490 disposed to the second construction 420 may be electrically coupled to the PCB 412 disposed to the first construction 410 via the sub PCB 447.

According to various embodiments, the electronic device 400 may include a bar supporting member (support) 470 disposed to at least partially overlap with the second supporting member 450 between the second plate 421 and the first supporting member 440. According to an embodiment, the bar supporting member 470 may be disposed movably in the direction (with respect to the first supporting member 440. According to an embodiment, the bar supporting member 470 may include a fourth planar portion 471 overlapping with the first planar portion 441 of the first supporting member 440 and a fifth planar portion 472 extending from the fourth planar portion 471. According to an embodiment, the fourth planar portion 471 may guide the supporting construction 460 for supporting at least part of the display 430, and the fifth planar portion 472 may be guided with respect to the second planar portion 442 of the first supporting member 440. According to an embodiment, the first supporting member 440, the second supporting member 450, the sub PCB 447, and the shaft 480 may be fixed to the second construction 420. According to an embodiment, the bar supporting member 470 may be disposed movably with respect to the first supporting member 440 depending on a close state or open state of the first construction 410.

According to various embodiments, the supporting construction 460 may include a bar 461 coupled to the first planar portion 441 of the first supporting member 440. For example, the bar 461 may be plural in number. According to an embodiment, the bar 461 may be disposed to extend from the first planar portion 441 of the first supporting member 440 to up to at least part of a space between the second supporting member 450 and the first face 4111 of the first plate 411 along an outer circumferential surface of the center hinge arm 452 and the pair of side hinge arms 443 and 444 having a circular cross-section. According to an embodiment, the bendable portion 432 of the display 430 may be disposed to be attached to an exterior surface to which the bar 461 of the supporting construction 460 is coupled. According to an embodiment, the bar 461 of the supporting member 460 may be moved together with the bendable portion 432 of the display 430 along with a guide construction (e.g., the guide construction 446 of FIG. 6A) of the first supporting member 440 when the first construction 410 is moved to an open state or a closed state with respect to the second construction 420.

According to various embodiments, the conductive construction 490 may include the dummy portion 491 disposed to the second plate 420 and/or the conductive coupling member 492 to be electrically coupled to the sub PCB 447 by being coupled from the dummy portion 491. According to an embodiment, the dummy portion 491 may include an injection portion and a board disposed to the injection portion. According to an embodiment, the conductive construction 490 may include an antenna module. According to an embodiment, the dummy portion 491 of the conductive construction 490 may be disposed to be physically in contact with the conductive unit lateral wall 4214 of the second plate 421 used as an antenna radiator. According to an embodiment, the conductive unit lateral wall 4214 may be electrically coupled to the sub PCB 447 via the dummy portion 491 and the conductive coupling member 492. For example, the conductive unit lateral wall 4914 may be electrically coupled to a wireless communication circuit 4121 mounted to the PCB 412 by being electrically coupled to the PCB 412 disposed to the first construction 410.

Figure 5:
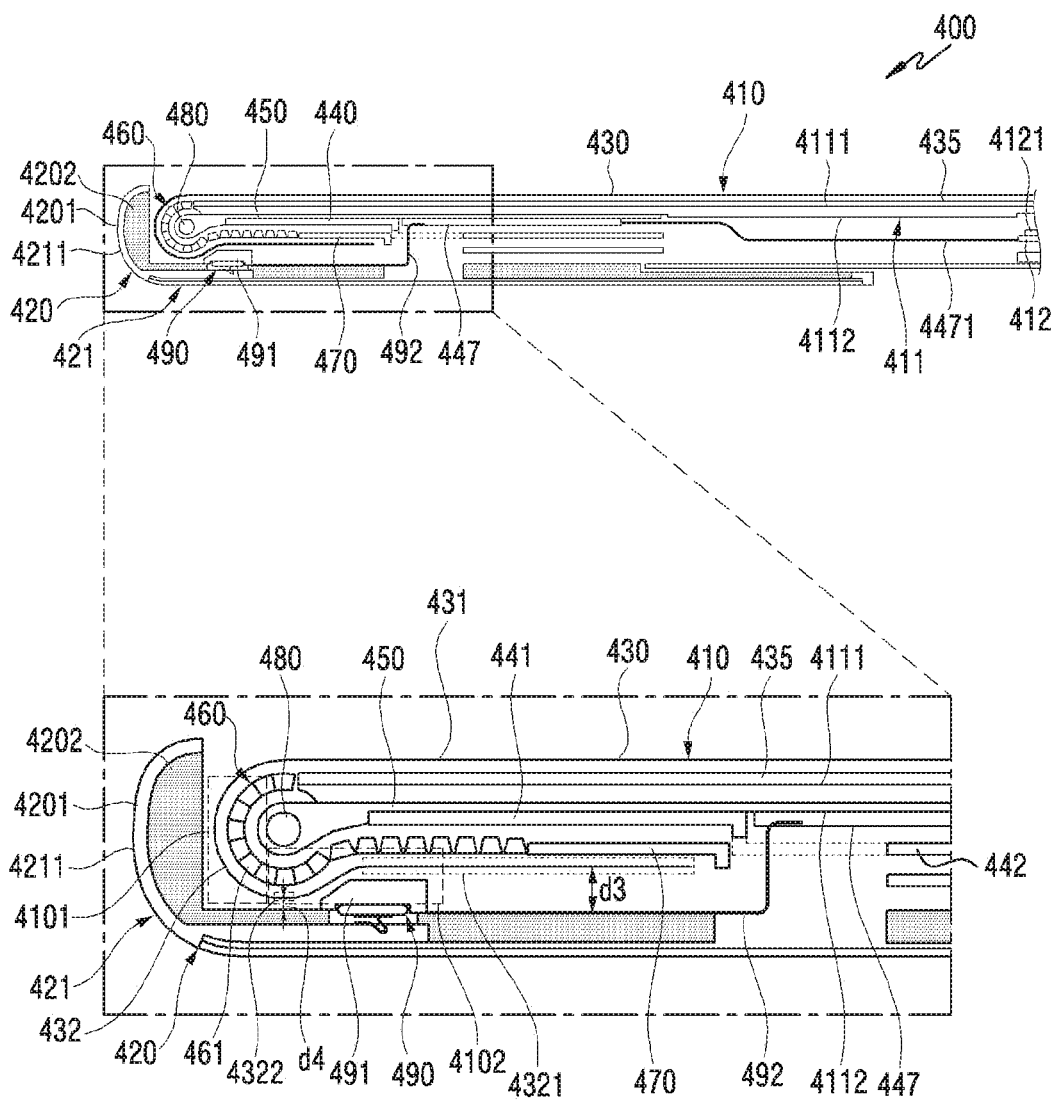
FIG. 5 is a cross-sectional view illustrating an example electronic device, cut along the line A-A' of FIG. 2A, according to various embodiments of the present disclosure.

FIG. 5 is a cross-sectional view illustrating the electronic device 400 (e.g., the electronic device 200 of FIG. 2A), cut along the line A-A' of FIG. 2A, according to various embodiments of the present disclosure.

The electronic device 400 of FIG. 5 may be at least partially similar to the electronic device 101 of FIG. 1 or the electronic device 200 of FIG. 2A to FIG. 3, or may include other embodiments of the electronic device 400.

Referring to FIG. 5, the electronic device 400 (e.g., the electronic device 200 of FIG. 2A) may have the first construction 410 disposed movably with respect to the second construction 420. According to an embodiment, when the first construction 410 is moved with respect to the second construction 420, the bar supporting member 470 to which the bendable portion 432 of the display 430 is attached may be moved with respect to the first supporting member 440 of the second construction 420.

According to various embodiments, the electronic device 400 may include a first space 4101 formed between the second plate 421 and the second face 4112 of a first plate 411 and a second space 4102 coupled to the first space 4101. According to an embodiment, when the first construction 410 is moved from a closed state to an open state, at least part of the bendable portion 432 of the display 430 may be moved from the first space 4101 and the second place 4102 to substantially define a plane between the planar portion 431 of the display 430 and the first lateral wall 4211 of the second plate 421 when viewed from above the first plate 411. According to an embodiment, in the closed state, the bendable portion 431 of the display 430 may be disposed such that a first portion 4321 of the bendable portion 432 is inserted to the second space 4102 along an outer circumferential surface of the supporting construction 460 from a space with respect to the first lateral walls 4211, and a second portion 4322 of the bendable portion 432 is located between the second plate 421 and the pair of hinge arms 443 and 444 of the first supporting member 440. According to an embodiment, in the open state, the first portion 4321 of the bendable portion 432 of the display 430 may be moved to the first space 4101, and the second portion 4322 may be moved to substantially construct a plane by being pulled out to the first face 4111 of the first plate 411.

According to various embodiments, in the closed state, since the electronic device 400 is constructed such that a third distance d3 between the second plate 421 and the first portion 4321 is greater than a fourth distance d4 between the second plate 421 and the second portion 4322, the conductive construction 490 may be disposed to a region having the third distance d3. According to an embodiment, it is possible to make the electronic device slim due to such a structure in which the conductive construction 490 is effectively disposed.

Figure 6A:
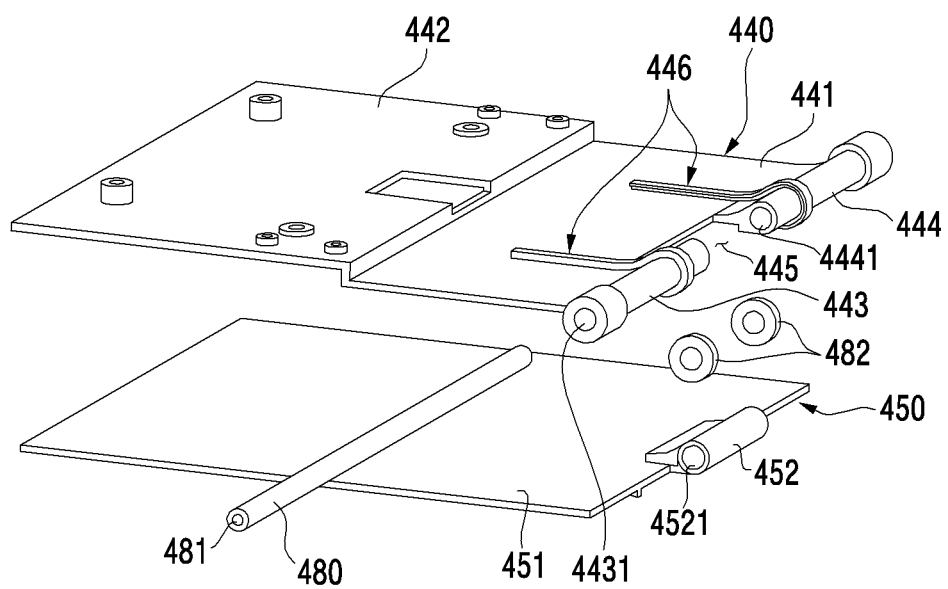
FIG. 6A and FIG. 6B are diagrams illustrating an example state where a first supporting member and a second supporting member are coupled according to various embodiments of the present disclosure.
Figure 6B:
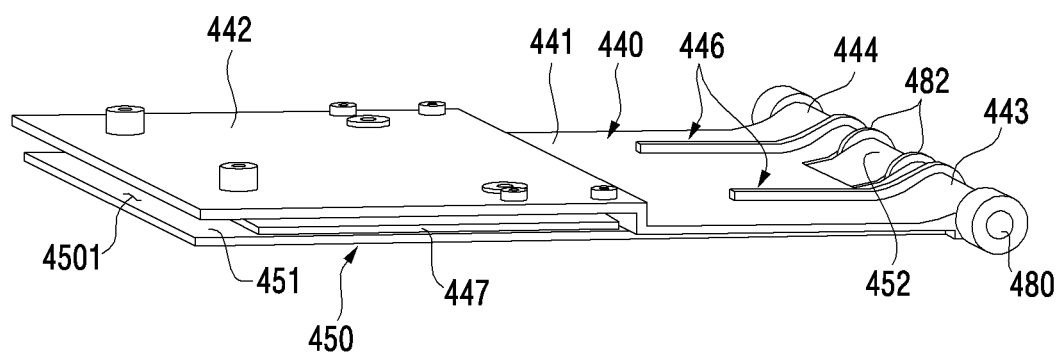

FIG. 6A and FIG. 6B are diagrams illustrating an example state where the first supporting member 440 and the second supporting member 450 are coupled according to various embodiments of the present disclosure.

Referring to FIG. 6A and FIG. 6B, the first supporting member 440 may include the first planer portion 441 and the second planar portion 442 which is extended to have a step difference with respect to a height of the first planar portion 441. According to an embodiment, the first supporting member 440 may include the pair of side hinge arms 443 and 444 disposed to have a substantially constant interval from one end of the first planar portion 441. According to an embodiment, the pair of side hinge arms 443 and 444 may be disposed to have a length in a direction (e.g., a direction ① of FIG. 4) perpendicular to the second lateral wall 4212 (e.g., the second lateral wall 4212 of FIG. 4) and parallel to the first lateral wall 4211 (e.g., the first lateral wall 4211 of FIG. 4), and may include the first through-hole 4431 and the second through-hole 4441. According to an embodiment, the second supporting member 450 may include the third planar portion 451 having an area corresponding to at least the first planar portion 441 and second planar portion 442 of the first supporting member 440. According to an embodiment, the second supporting member 450 may include the center hinge arm 452 extended from the second planar portion 442 so as to be inserted to a space 445 between the pair of hinge arms 443 and 444 of the first supporting member 440. According to an embodiment, the center hinge arm 452 may include the third through-hole 4521. According to an embodiment, the first supporting member 440 and the second supporting member 450 may be mutually fixed by means of the shaft 480 disposed to penetrate both the first through-hole 4431 of the pair of side hinge arms 443 and 444 and the third through-hole 4521 of the sensor hinge arm 452, in a state where the pair of side hinge arms 443 and 444 and the sensor hinge arm 452 are coupled temporarily. According to an embodiment, the pair of washers 482 may be disposed between the center hinge arm 452 and the pair of side hinge arms 443 and the 444 so that the coupling is achieved more firmly.

According to various embodiments, the second planar portion 442 of the first supporting member 440 may be disposed to have a step difference and to be closer to the second plate 421 (e.g., the second plate 421 of FIG. 4) than the first planar portion 441. For example, when the first supporting member 440 and the second supporting member 450 are coupled by means of the shaft 480, a space 4501 may be constructed between the second planar portion 442 of the first supporting member 440 and the third planar portion 451 of the second supporting member 450. According to an embodiment, the sub PCB 447 may be disposed to the space 4501.

Figure 6C:
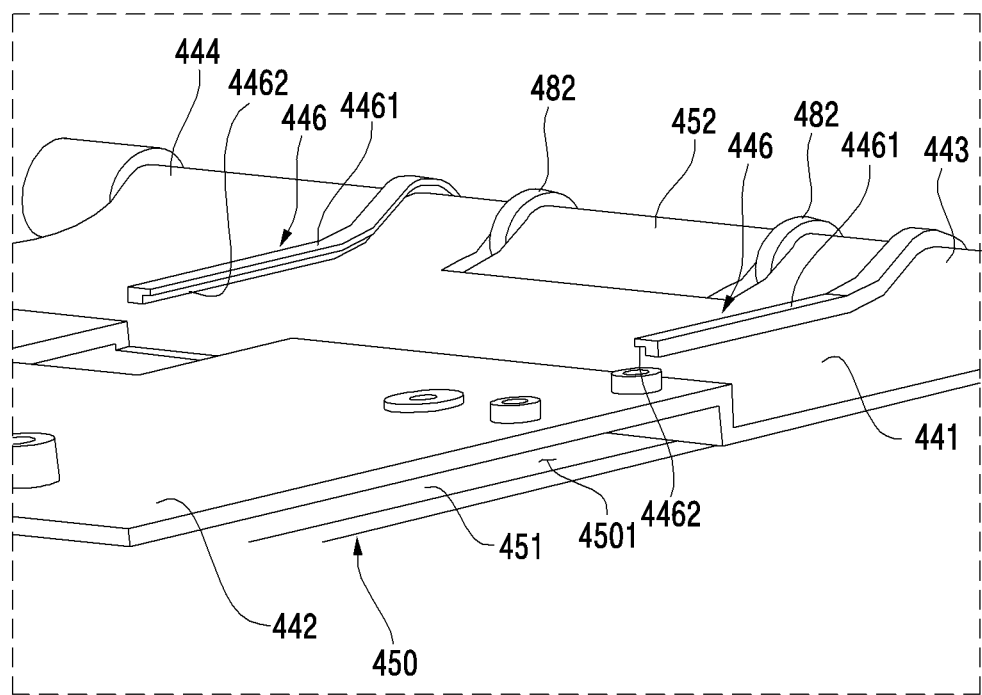
FIG. 6C and FIG. 6D are diagrams illustrating an example structure in which a supporting construction (assembly) is disposed to a first supporting member according to various embodiments of the present disclosure.
Figure 6D:
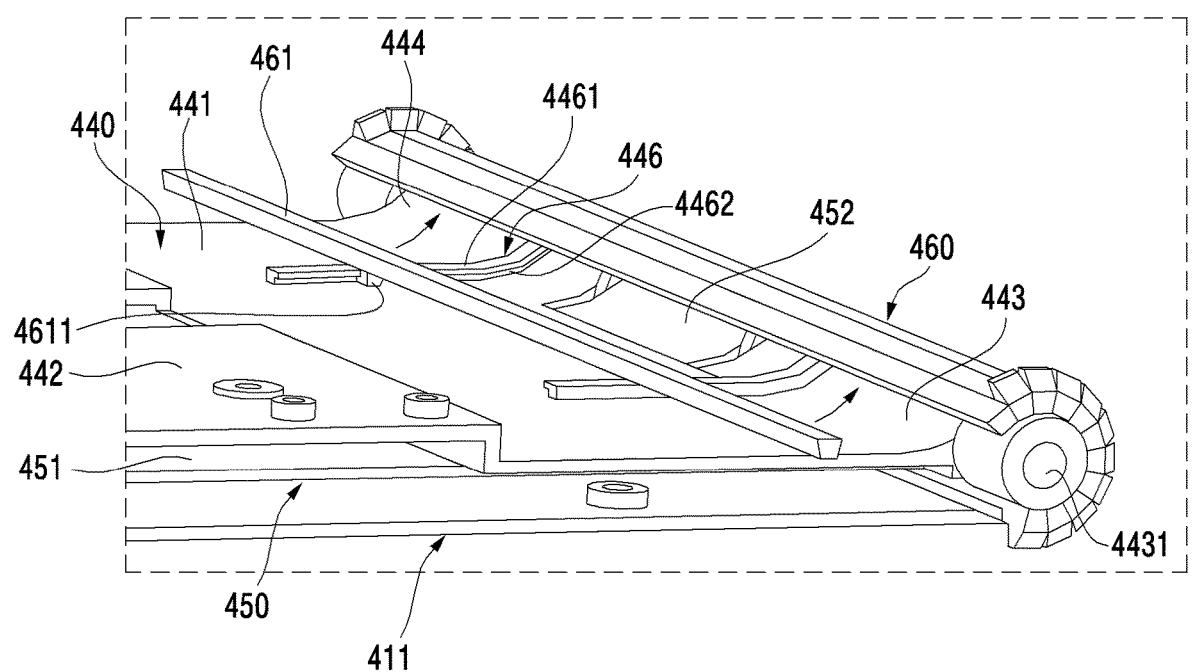

FIG. 6C and FIG. 6D are diagrams illustrating an example structure in which a supporting construction is disposed to the first supporting member 440 according to various embodiments of the present disclosure.

According to various embodiments, the first supporting member 440 may include a guide 446 constructed in a lengthwise direction along an outer circumferential surface of the pair of side hinge arms 443 and 444 from at least part of the first planar portion 441. According to an embodiment, the guide 446 may include a guide rib 4461 having a guide groove 4462 and extended to have a specific height from an exterior surface of the first planar portion 441 of the first supporting member 440 and the pair of side hinge arms 443 and 444.

According to various embodiments, the supporting construction 460 may include the bar 461 sequentially coupled to the guide rib of the first supporting member 440. For example, the bar 461 may be plural in number. According to an embodiment, the bar 461 may include a guide protrusion 4461 disposed at a location corresponding to a guide rib 4611. For example, the bar 461 may be sequentially coupled in such a manner that the guide protrusion 4611 of the bar 461 is guided by the guide rib 4461 and guide groove 4462 of the guide 446. According to an embodiment, the plurality of guide bars 461 may be disposed to be extended from the first planar portion 441 to up to at least part of a space between the first plate 441 and the second supporting member 450 along an outer circumferential surface of the pair of side hinge arms 443 and 444 having a circular cross-section and the center hinge arm 452 of the first supporting member 450.

Figure 6E:
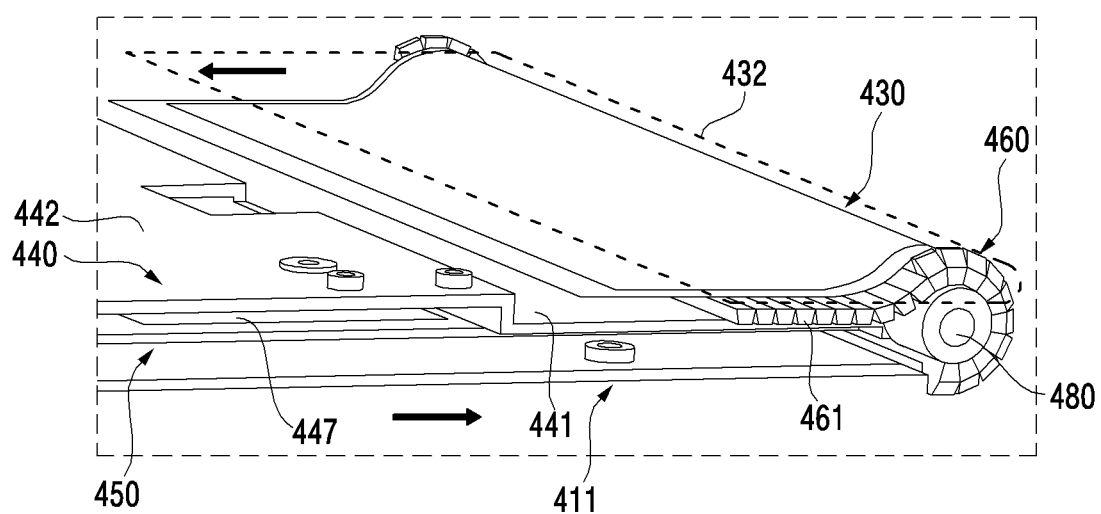
FIG. 6E and FIG. 6F are diagrams illustrating an example state where a display is disposed to a supporting construction (assembly) according to various embodiments of the present disclosure.
Figure 6F:
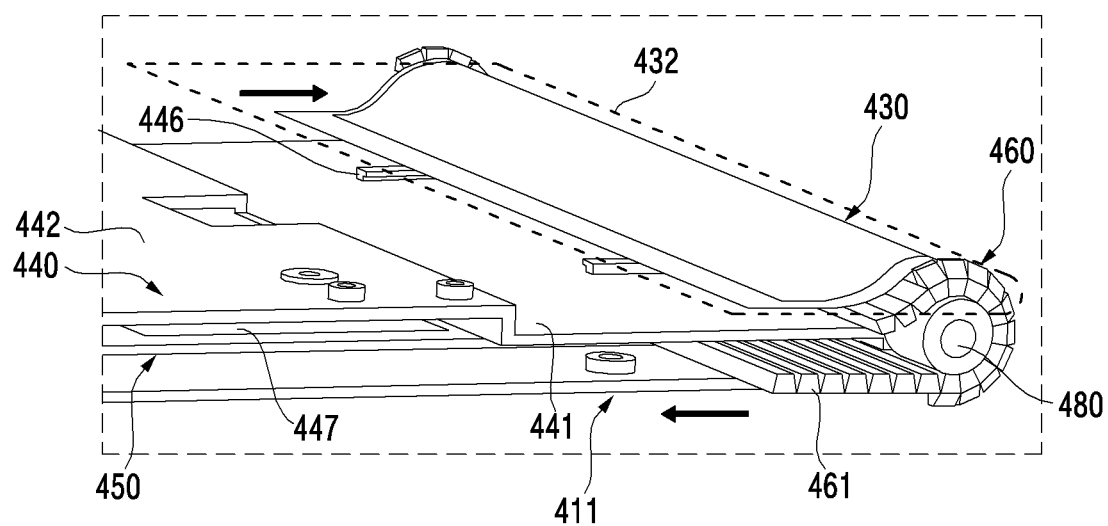

FIG. 6E and FIG. 6F are diagrams illustrating an example state where a display is disposed to a supporting construction according to various embodiments of the present disclosure.

FIG. 6E illustrates a state where a first construction (e.g., the first construction 410 of FIG. 4) is in a closed state with respect to a second construction (e.g., the second construction 420 of FIG. 4), and FIG. 6F illustrates a state where the first construction (e.g., the first construction 410 of FIG. 4) is in an open state with respect to the second construction (e.g., the second construction 420 of FIG. 4).

Referring to FIG. 6E and FIG. 6F, the bendable portion 432 of the display 430 may be disposed to be attached to an exterior surface to which the bar 461 of the supporting construction 460 is coupled. According to an embodiment, the bar 461 of the supporting member 460 may be moved together with the bendable portion 432 of the display 430 along with a guide (e.g., the guide 446 of FIG. 6A) of the first supporting member 440 when the first construction 410 is moved to an open state or a closed state with respect to the second construction 420. For example, the bendable portion 432 of the display 430 may be moved to correspond to a curved shape of a corresponding region to which a conductive construction (e.g., the conductive construction 490 of FIG. 4) constructed by the bar 461 is disposed.

Figure 7A:
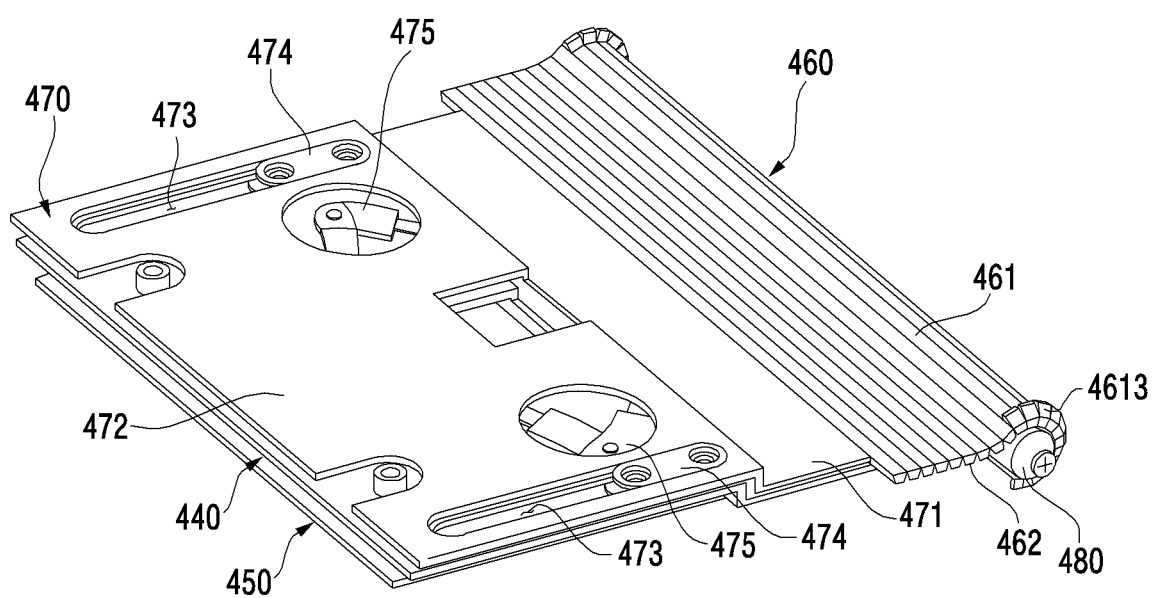
FIG. 7A is a diagram illustrating an example state where a bar supporting member is disposed to a first supporting member according to various embodiments of the present disclosure.

FIG. 7A is a diagram illustrating an example state where the bar supporting member 470 is disposed to the first supporting member 440 according to various embodiments of the present disclosure.

Referring to FIG. 7A, in a state where the first supporting member 440 and the second supporting member 450 are assembled by the shaft 480, the bar 461 may be joined to the guide 446 of the first supporting member 440. For example, the bar 461 may be plural in number. According to an embodiment, the bar supporting member 470 may be disposed to the first supporting member 440 in such a manner that at least part thereof overlaps. According to an embodiment, the bar supporting member 470 may be disposed movably in the direction ① of FIG. 4 with respect to the first supporting member 440. According to an embodiment, the bar supporting member 470 may include the fourth planar portion 471 overlapping with the first planar portion (e.g., the first planar portion 441 of FIG. 4) of the first supporting member 440 and the fifth planar portion 472 extending from the fourth planar portion. According to an embodiment, the bar supporting member 470 may be disposed movably with respect to the first supporting member 440 according to a closed state or open state of the first construction 410. According to an embodiment, the bar supporting member 470 may include a guide slit 473 constructed to be guided by a guide link 474 disposed to the first supporting member 440. According to an embodiment, the electronic device (e.g., the electronic device 400 of FIG. 4) may include at least one actuator 475 disposed between the bar supporting member 470 and the first supporting member 440. According to an embodiment, when the first construction (e.g., the first construction 410 of FIG. 4) is moved with respect to the second construction (e.g., the second construction of FIG. 4), in case of passing a specific inflection point, the actuator 475 may provide pressing force to press the first construction (e.g., the first construction 410 of FIG. 4) in a fully closed direction or a fully open direction with respect to the second construction (e.g., the second construction of FIG. 4). However, without being limited thereto, the actuator 475 may provide a free stop and/or at least one stop section. According to an embodiment, one end of the actuator 475 may be movably fixed to the bar supporting member 470, and the other end may be movably fixed to the first supporting member 440. For another example, although there are two guide links 474, two guide slits 473, and two actuators 475 in FIG. 7A, the number of these components may be one or at least three.

Figure 7B:
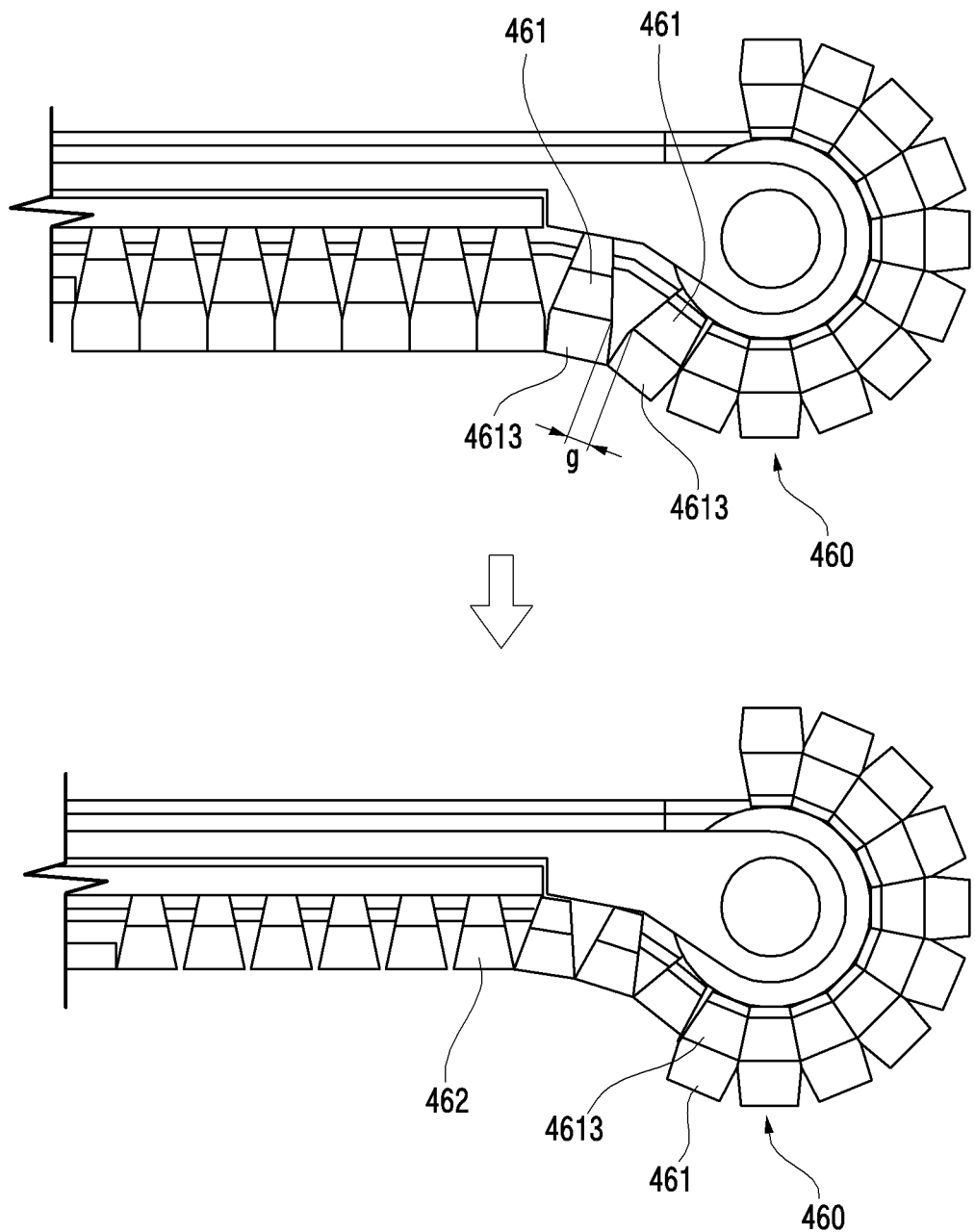
FIG. 7B is a diagram illustrating an example structure of disposing a supporting construction (assembly) according to various embodiments of the present disclosure.

FIG. 7B illustrates a structure of disposing the supporting construction 460 according to various embodiments of the present disclosure.

Referring to FIG. 7B, the bar 461 coupled along an outer circumferential surface of the pair of side hinge arms 443 and 444 of the first supporting member 440 and the center hinge arm 452 of the second supporting member 450 may have guide pieces 4613 disposed to both end portions thereof. According to an embodiment, when the bar 461 is coupled, the guide pieces 4613 are coupled to each other, thereby preventing the display 430 guided on an upper portion thereof from being detached. According to an embodiment, since the guide piece 4613 is constructed to protrude relatively, when it is moved in a curved shape along the hinge arm, a gap 'g' which becomes wider in a specific angle may be constructed as illustrated. The gap becomes wider when the bar 461 is moved to a curved portion of the hinge arm, and thus may not be able to guide the display. For example, since the guide piece 4613 may be omitted in a portion 462 of the bar 461, which corresponds to a bendable portion of the display, the gap may be prevented from occurring when moved to the hinge arm.

Figure 7C:
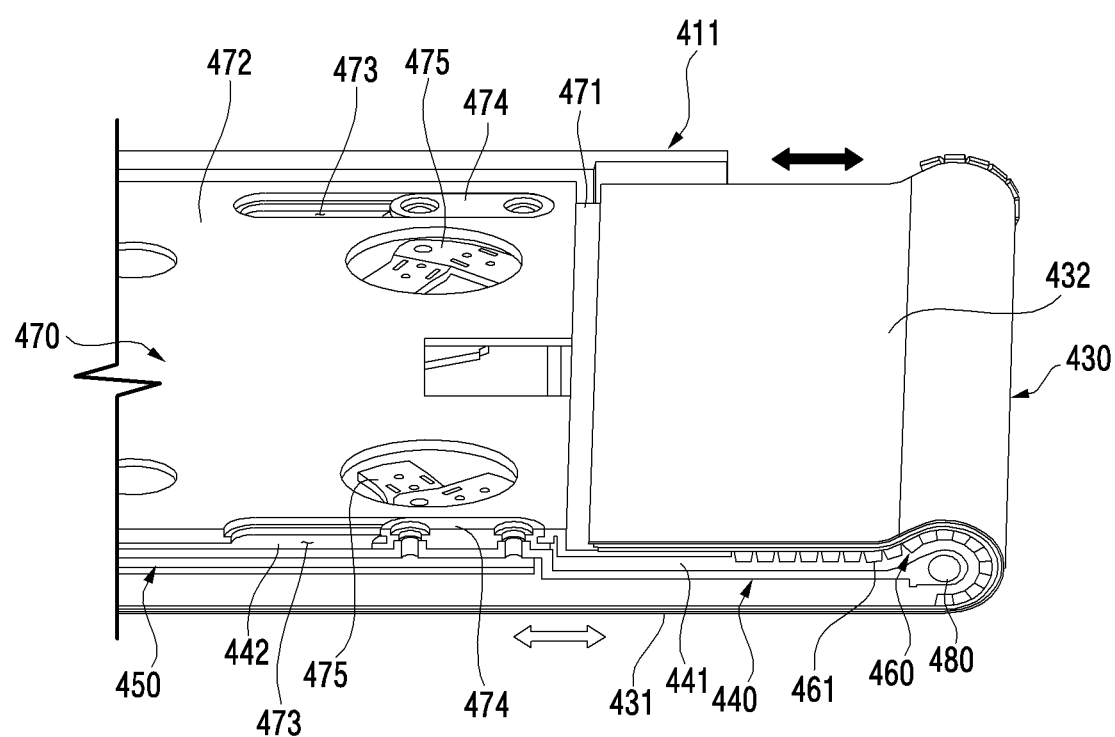
FIG. 7C is a diagram illustrating structure in which a display is disposed to a supporting construction (assembly) and a bar supporting member according to various embodiments of the present disclosure.

FIG. 7C is a diagram illustrating an example structure in which the display 430 is disposed to the supporting construction 460 and the bar supporting member 470 according to various embodiments of the present disclosure.

Referring to FIG. 7C, the first supporting member 440 and the second supporting member 450 may be coupled by the shaft 480, and thereafter the supporting construction 460 including the bar 461 may be disposed to the first supporting member 440. According to an embodiment, the display 430 may be fixed in such a manner that the bendable portion 432 extended from the planar portion 431 is bent along an exterior surface of the bar 461 disposed along the hinge arms 443 and 444 of the first supporting member 440 and is attached to the fourth planar portion 471 of the bar supporting member 470.

According to various embodiments, when the first construction (e.g., the first construction 410 of FIG. 4) is open with respect to the second construction (e.g., the second construction 420 of FIG. 4), an area of the display 430 may be increased, and the bar supporting member 470 may be moved with respect to the first supporting member 440 while being moved along the bendable portion 432 of the display 430.

Figure 8A:
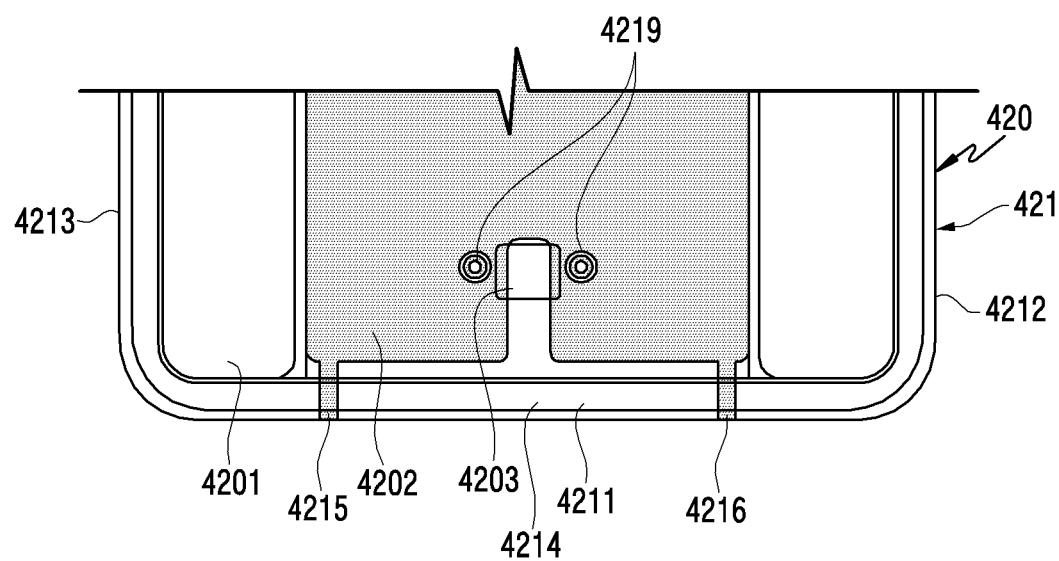
FIG. 8A is a diagram illustrating an example structure of a second plate according to various embodiments of the present disclosure.

FIG. 8A is a diagram illustrating an example structure of the second plate 421 according to various embodiments of the present disclosure.

Referring to FIG. 8A, the second construction 420 may include the second plate 421. According to an embodiment, the second plate 421 may comprise a heterogeneous material. For example, the second plate 421 may be constructed in such a manner that a conductive member 4201 and a non-conductive member 4202 are insert-injected. According to an embodiment, a first lateral wall 4211 of the second construction 420 may be constructed of the conductive member 4201. According to an embodiment, the first lateral wall 4211 may include the conductive unit lateral wall 4214 electrically decoupled from a neighboring conductive member due to the first non-conductive portion 4215 and/or second non-conductive portion 4216 disposed to be spaced apart by a specific interval. According to an embodiment, the conductive unit lateral wall 4214 may be extended up to a location at which a conductive construction (e.g., the conductive construction 490 of FIG. 8B) is disposed through a conductive coupling portion 4203. However, without being limited thereto, a conductive construction may also be disposed to the second lateral wall 4212 and/or third lateral wall 4213 of the second construction 420.

Figure 8B:
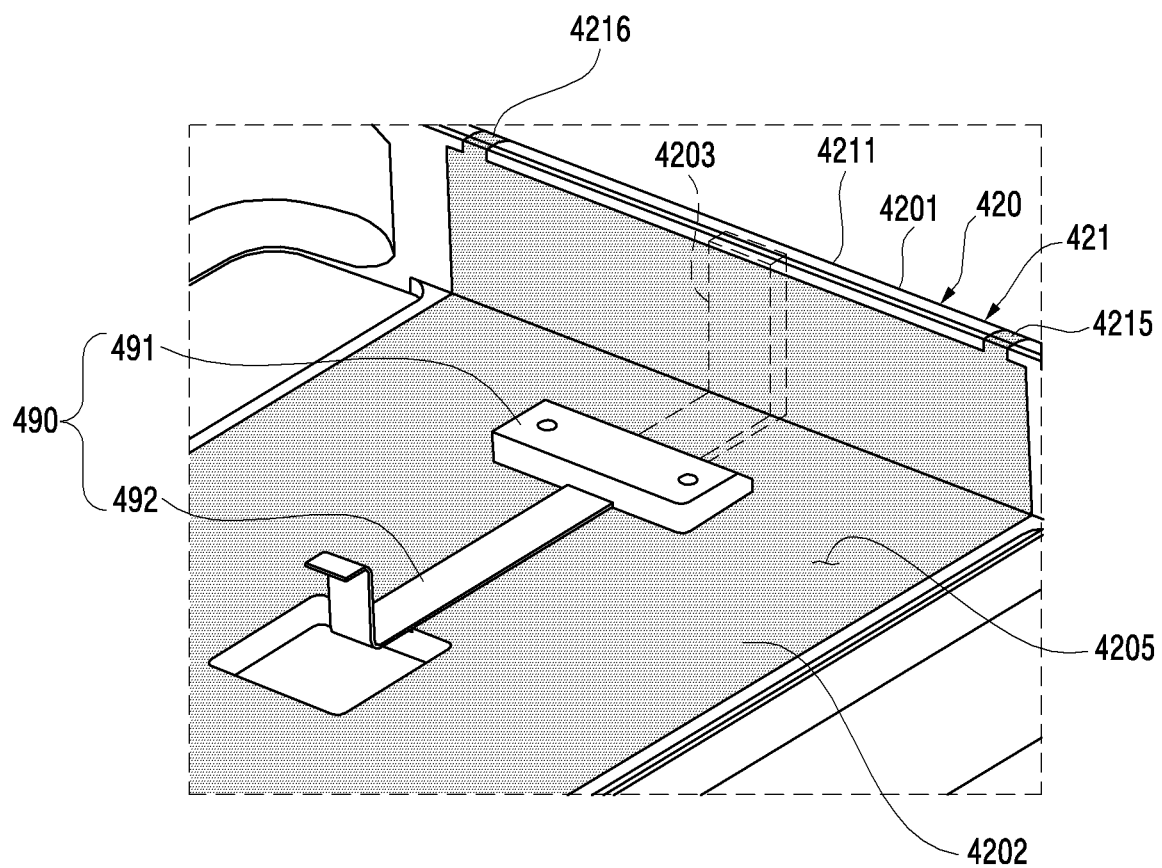
FIG. 8B and FIG. 8C are diagrams illustrating an example structure in which a conductive construction (assembly) is disposed to a second plate according to various embodiments of the present disclosure.
Figure 8C:
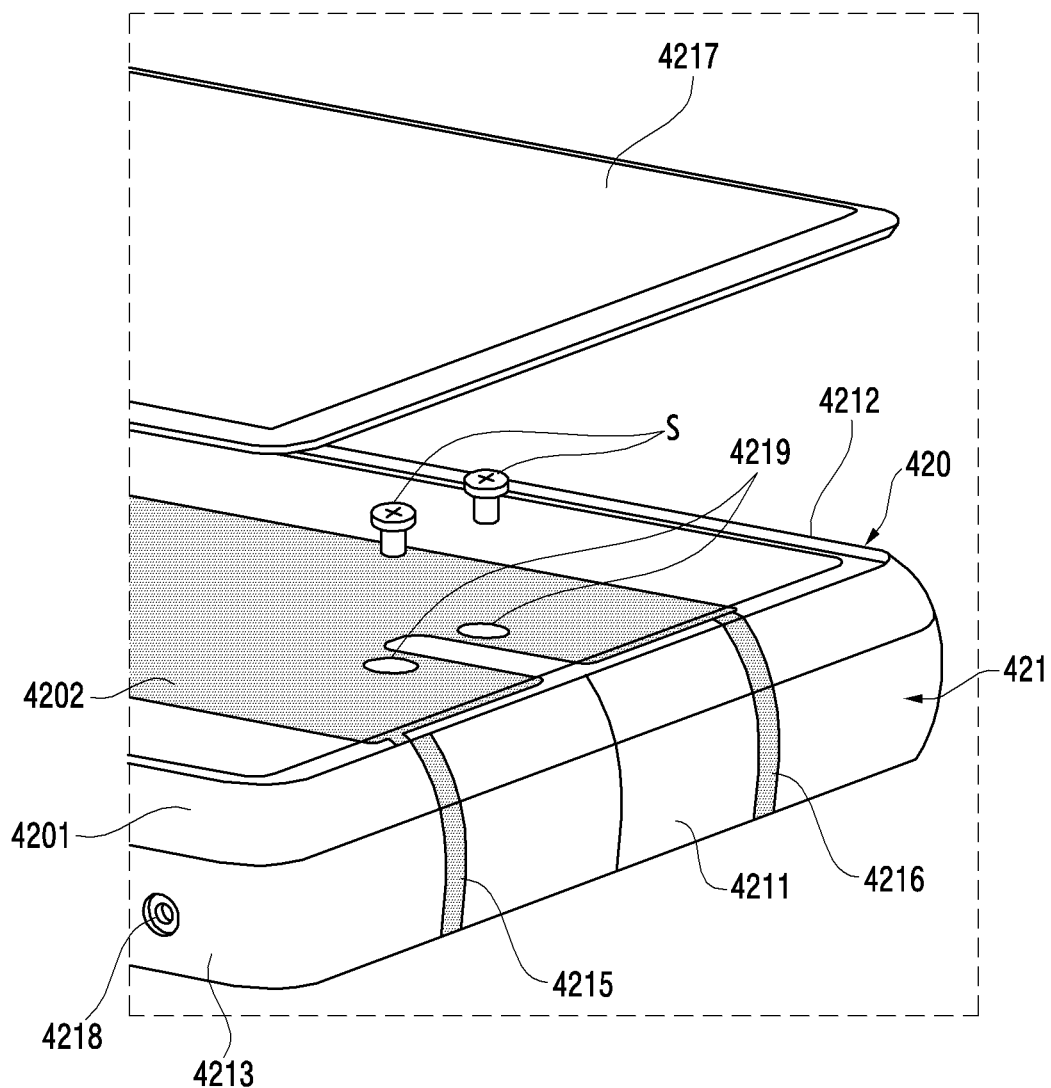

FIG. 8B and FIG. 8C are diagrams illustrating an example structure in which the conductive construction 490 is disposed to the second plate 421 according to various embodiments of the present disclosure.

Referring to FIG. 8B and FIG. 8C, the conductive construction 490 may be disposed inside a trough 4205 provided by the first lateral wall 4211, second lateral wall 4212, and third lateral wall 4213 of the second plate 421. According to an embodiment, the conductive construction 490 may include the dummy portion 491 and the electrical coupling member 492 (e.g., FPCB) pulled out by a specific length from the dummy portion 491 and electrically coupled to a sub PCB (e.g., the sub PCB 447 of FIG. 4). According to an embodiment, the dummy portion 491 may include a board, and may be electrically coupled to the conductive coupling portion 4203 exposed from the trough 4205 directly or via a coupling member such as, for example, and without limitation, a c-clip, or the like. According to an embodiment, the dummy portion 491 may be fixed to the second plate 421 by means of a screw S joined via a screw joining hole 4219 provided in the second plate 421, and a screw joining portion may be hidden via the second rear cover 4217. According to an embodiment, the conductive unit lateral wall 4214 may operate as an antenna radiator by being electrically coupled to a wireless communication circuit of a PCB (e.g., the PCB 412 of FIG. 4) disposed inside the electronic device.

Figure 9:
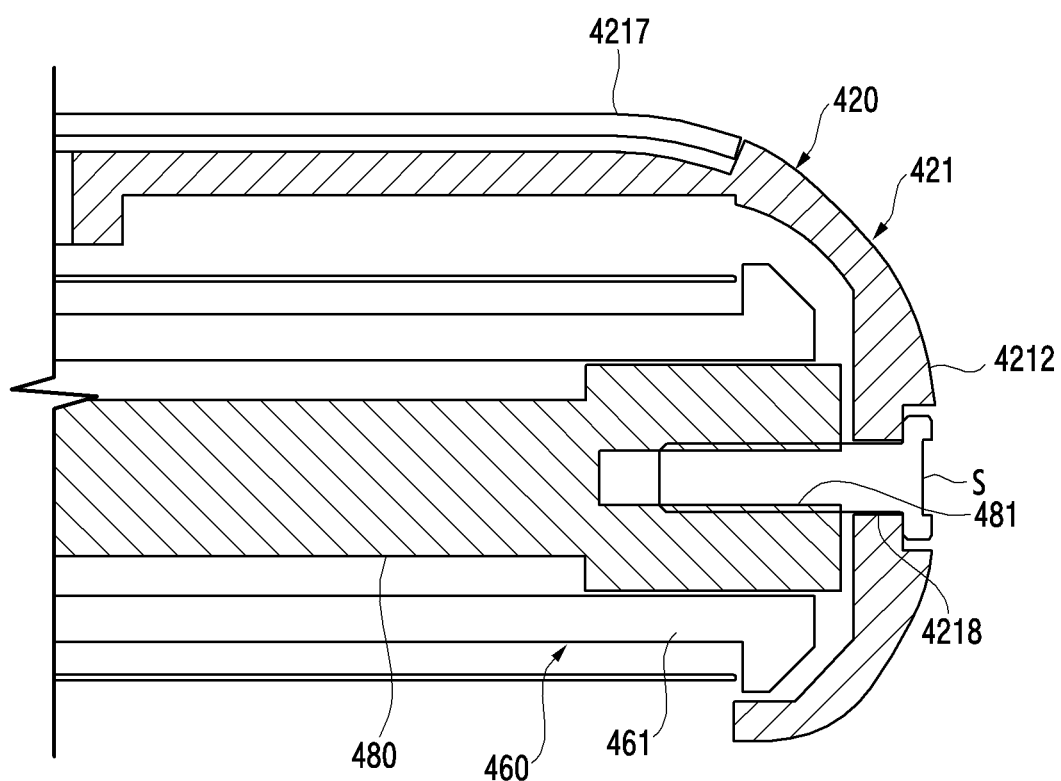
FIG. 9 is a cross-sectional view illustrating an example state where a second plate and a shaft are joined according to various embodiments of the present disclosure.

FIG. 9 is a cross-sectional view illustrating an example state where the second plate 421 and the shaft 480 are joined according to various embodiments of the present disclosure.

Referring to FIG. 9, the second plate 421 of the second construction 420 may be coupled to the shaft 480. According to an embodiment, the second plate 421 may be fixed by means of a screw S joined to a screw joining hole 481 disposed to the shaft 480 via a screw joining hole 4218 constructed by using the second lateral wall 4212 of the second construction 420. According to an embodiment, the shaft 480 may be constructed of a conductive material, and a conductive portion of the second plate 421 may be electrically coupled to the shaft 480 constructed of the conductive material by means of a screw S by joining the second lateral wall 4212 constructed as a conductive member by means of the screw S constructed of the conductive material. For example, the second plate 421 may be grounded via the conductive shaft 480, thereby avoiding an electric shock accident and radiation performance deterioration of an antenna radiator due to gripping of the device.

Figure 10:
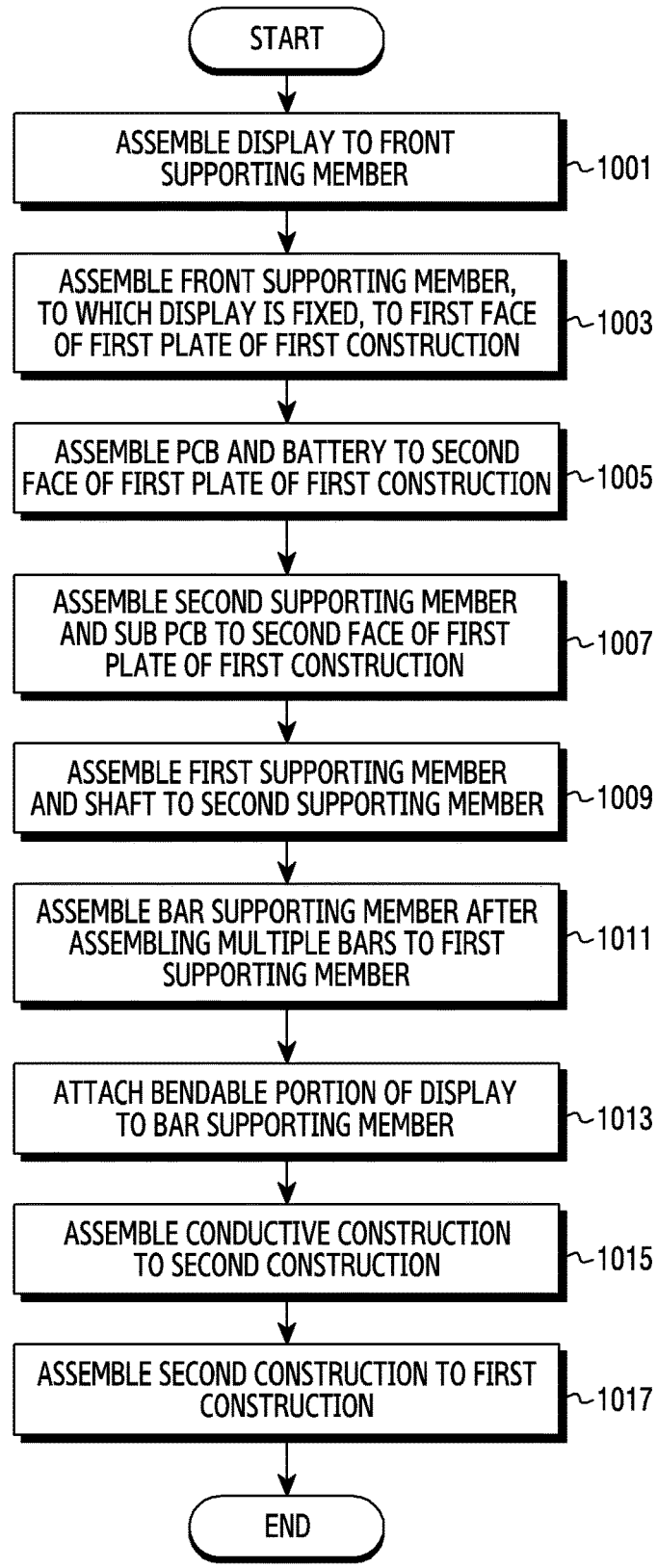
FIG. 10 is a flowchart illustrating an example process of assembling an electronic device according to various embodiments of the present disclosure.

FIG. 10 is a flowchart illustrating an example process of assembling an electronic device (e.g., the electronic device 200 of FIG. 2A or the electronic device 400 of FIG. 4) according to various embodiments of the present disclosure. FIGS. 11A, 11B, 11C, 11D, 11E, 11F, 11G and 11I are diagrams illustrating the example assembling process based on the flowchart of FIG. 10 according to various embodiments of the present disclosure.

Figure 11A:
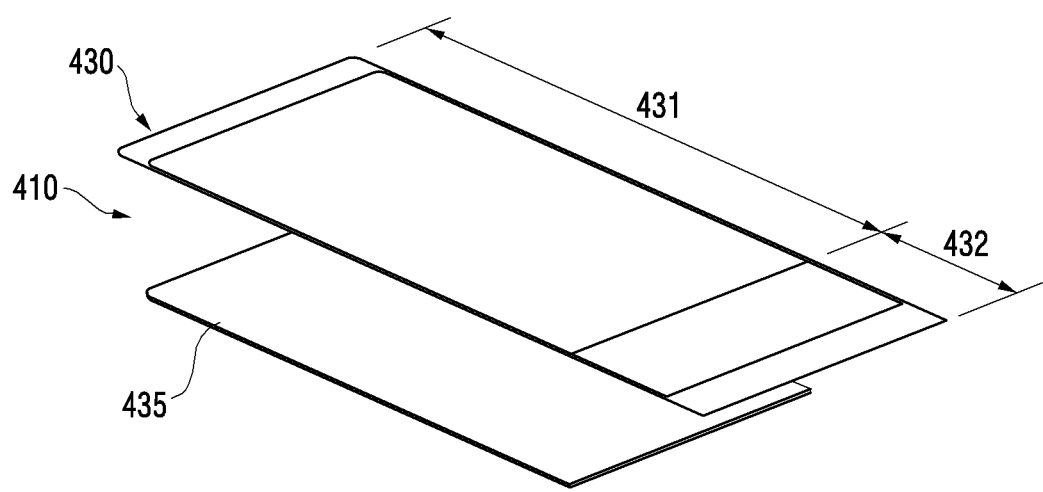
FIG. 11A, 11B, 11C, 11D, 11E, 11F, 11G, 11H and FIG. 11I are diagrams illustrating an example assembling process based on the flowchart of FIG. 10 according to various embodiments of the present disclosure.

According to various embodiments, in operation 1001, referring to FIG. 11A, the display 430 (e.g., the display 212 of FIG. 2A) may be assembled to the front supporting member 435. According to an embodiment, the display 430 may include the planar portion 431 and the bendable portion 432 extending from the planar portion 431. According to an embodiment, the display 430 may be assembled in such a manner that the planar portion 431 is attached to the front supporting member 435 through a process of, for example, and without limitation, screw fastening, taping, bonding, or the like.

Figure 11B:
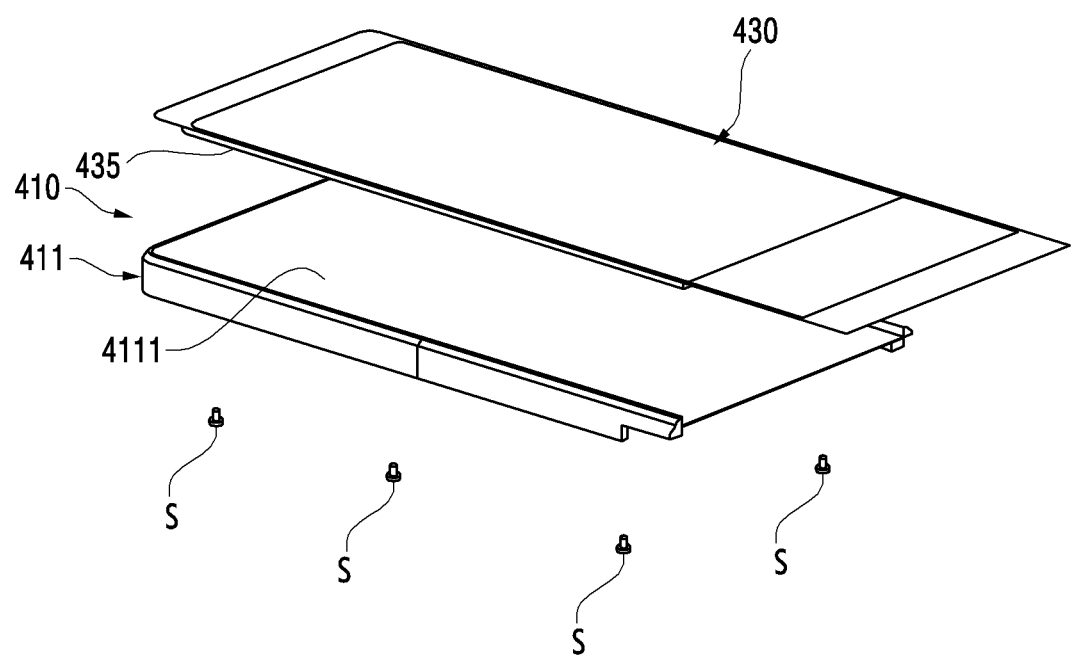

In operation 1003, referring to FIG. 11B, the front supporting member 435 to which the display 430 is fixed may be assembled to the first face 4111 of the first plate 411 of the first construction 410. According to an embodiment, the front supporting member 435 may also be attached to a first face through the process of, for example, and without limitation, screw fastening (S), taping, bonding, or the like. According to an embodiment, the operations 1001 and 1003 may be performed together, or the operation 1003 may be first performed, followed by the operation 1001.

Figure 11C:
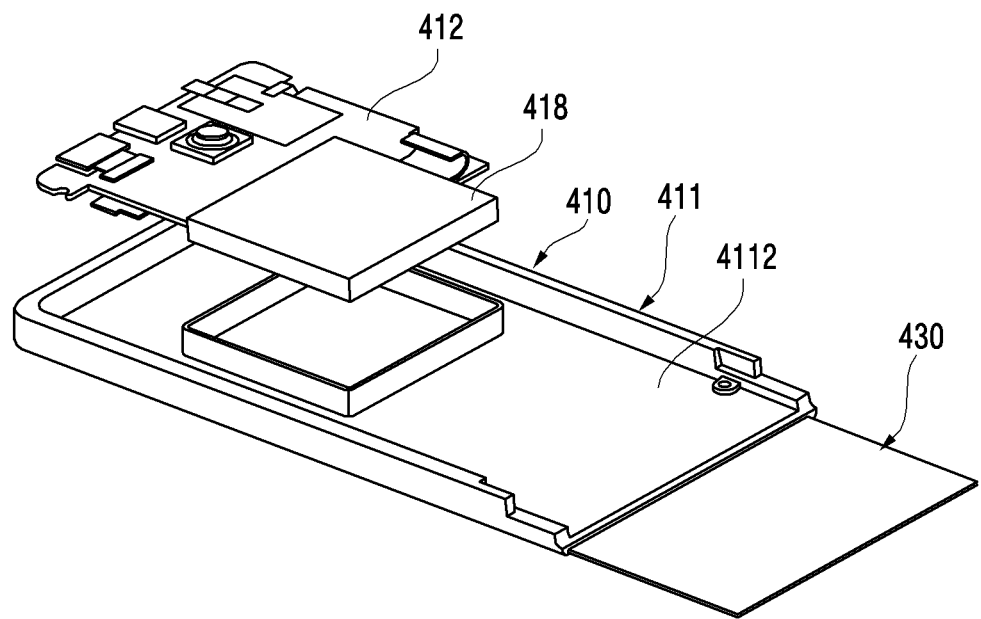

In operation 1005, referring to FIG. 11C, the PCB 412 and the battery 418 may be assembled to the second face 4112 of the first plate 411 of the first construction 410. According to an embodiment, the PCB 413 may be disposed by avoiding a battery disposition region, or may be disposed by overlapping with at least part of the battery disposition region.

Figure 11D:
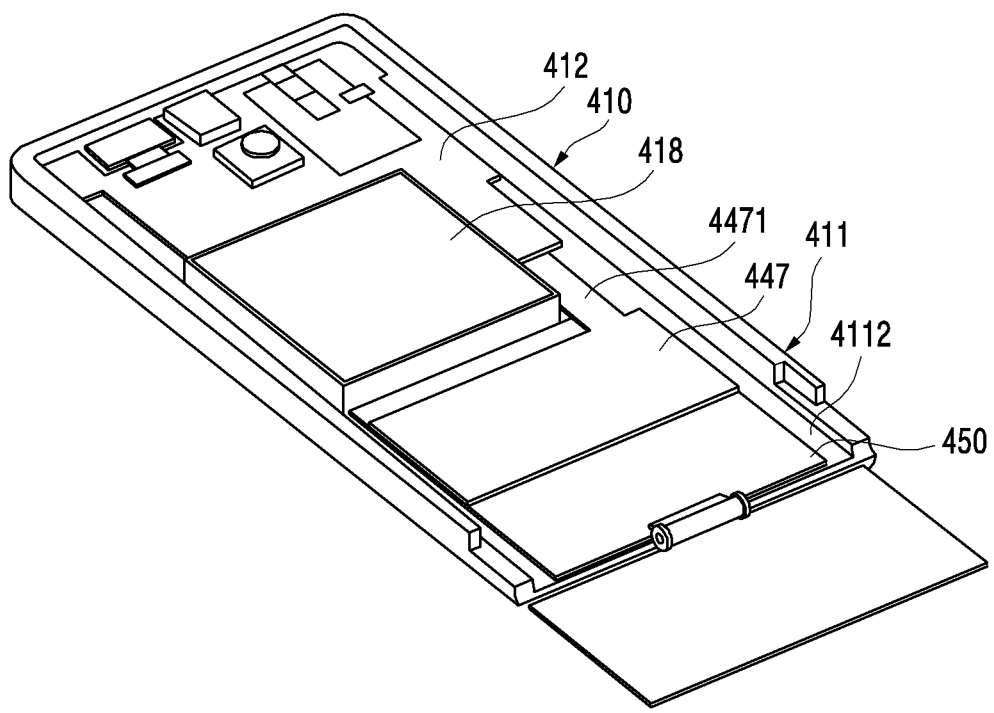

In operation 1007, referring to FIG. 11D, the second supporting member 450 and the sub-PCB 447 may be assembled to the second face 4112 of the first plate 411 of the first construction 410. According to an embodiment, the sub-PCB 447 may be electrically coupled to the PCB 412 through an electrical coupling member 4471 (e.g., FPCB) including a bending portion having a bending property. The electrical coupling member 4471 may be constructed to have a sufficiently enough length or shape to cover a movement distance by which the first plate 411 of the first construction 410 is moved between a closed state and open state with respect to the sub PCB 447 and second supporting member 450 fixed to the second construction (e.g., the second construction 420 of FIG. 4). According to an embodiment, the bending portion of the electrical coupling member 4471 may be constructed in a shape of, for example, and without limitation, a 'U', an 'S', or the like.

Figure 11E:
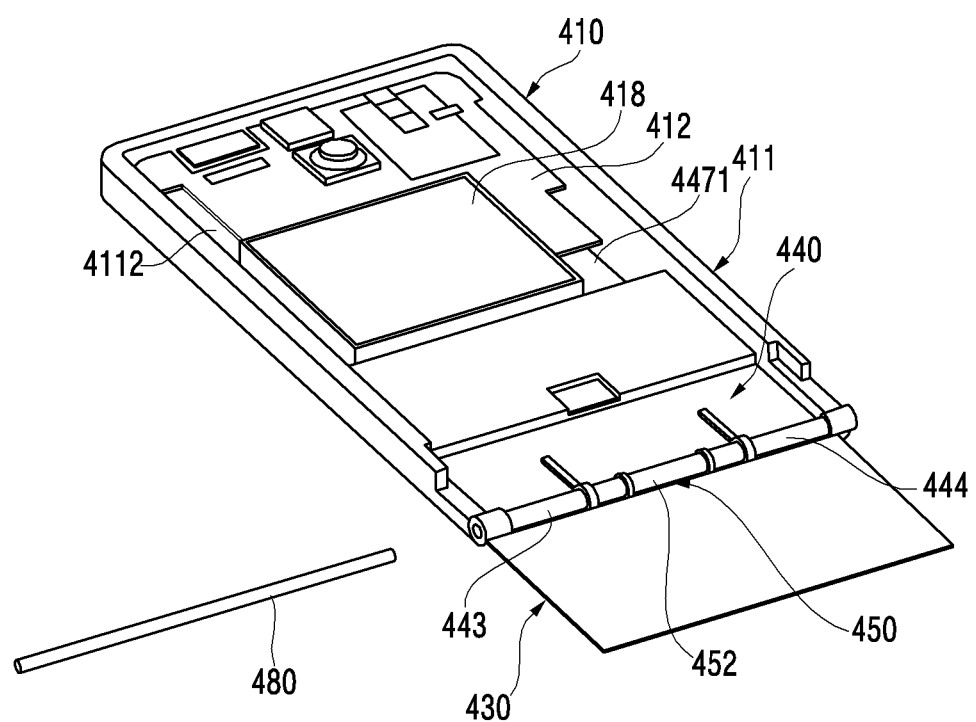

In operation 1009, referring to FIG. 11E, the first supporting member 440 and the shaft 480 may be assembled to the second supporting member 450. According to an embodiment, the first supporting member 440 may be fixed to the second supporting member 450 since the shaft 480 penetrates the center hinge arm 452 disposed to the second supporting member 450 and the pair of side hinge arms 443 and 444 disposed to the first supporting member 440.

Figure 11F:
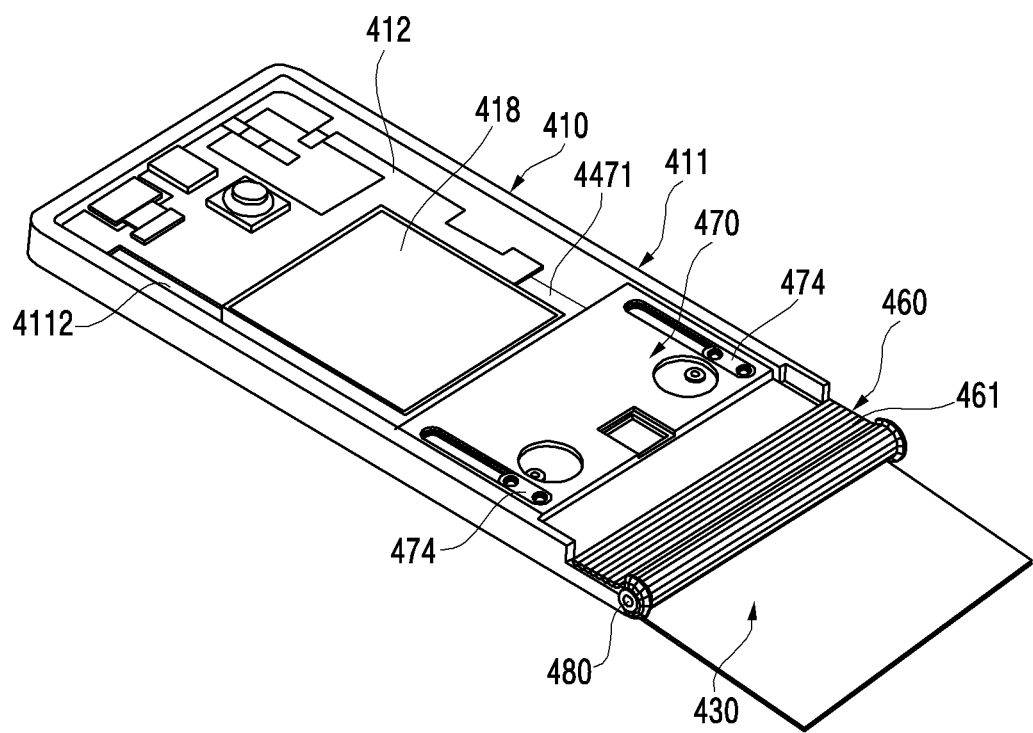

In operation 1011, referring to FIG. 11F and FIG. 6D, after the bar 461 of the support construction 460 is assembled to the first supporting member 440, the bar supporting member 470 may be assembled to an end portion thereof. According to an embodiment, the bar supporting member 470 may be disposed movably with respect to the first supporting member 440 in the same direction as a direction in which the first construction 410 is moved with respect to the second construction (e.g., the second construction 420 of FIG. 4).

Figure 11G:
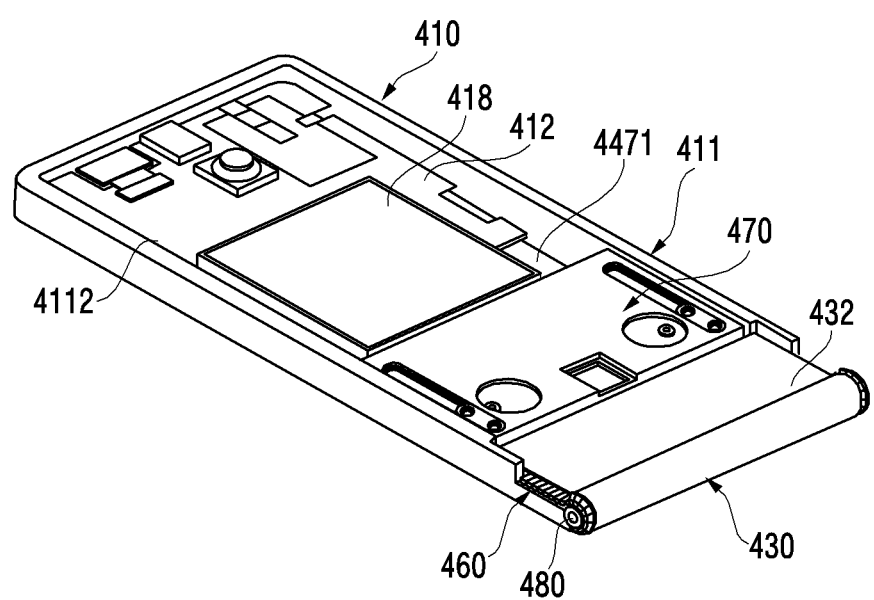

In operation 1013, referring to FIG. 11G and FIG. 6E, the bendable portion 432 of the display 430 may be attached to the bar supporting member 470. According to an embodiment, an end portion of the bendable portion 432 may be attached to the bar supporting member 470. According to an embodiment, the second plate 421 and the portion attached to the bar supporting member 470 of the bendable portion 432 may provide a specific separation distance (e.g., the third distance d3 of FIG. 5). According to an embodiment, the second plate 421 and the portion attached to the bar 461 of the bendable portion 432 may provide a distance (e.g., the fourth distance d4 of FIG. 5) shorter than the separation distance. According to an embodiment, the distance (e.g., the third distance d3 of FIG. 5) provided by the second plate 421 and the portion attached to the bar supporting member 470 of the bendable portion 432 is relatively greater than a surrounding region, and thus may be utilized as a space of disposing a conductive construction (e.g., the conductive construction 490 of FIG. 4). According to an embodiment, the bendable portion 432 of the display 430 may be attached, for example, and without limitation, by taping, bonding, or the like, an end portion of the bar supporting member 470.

Figure 11H:
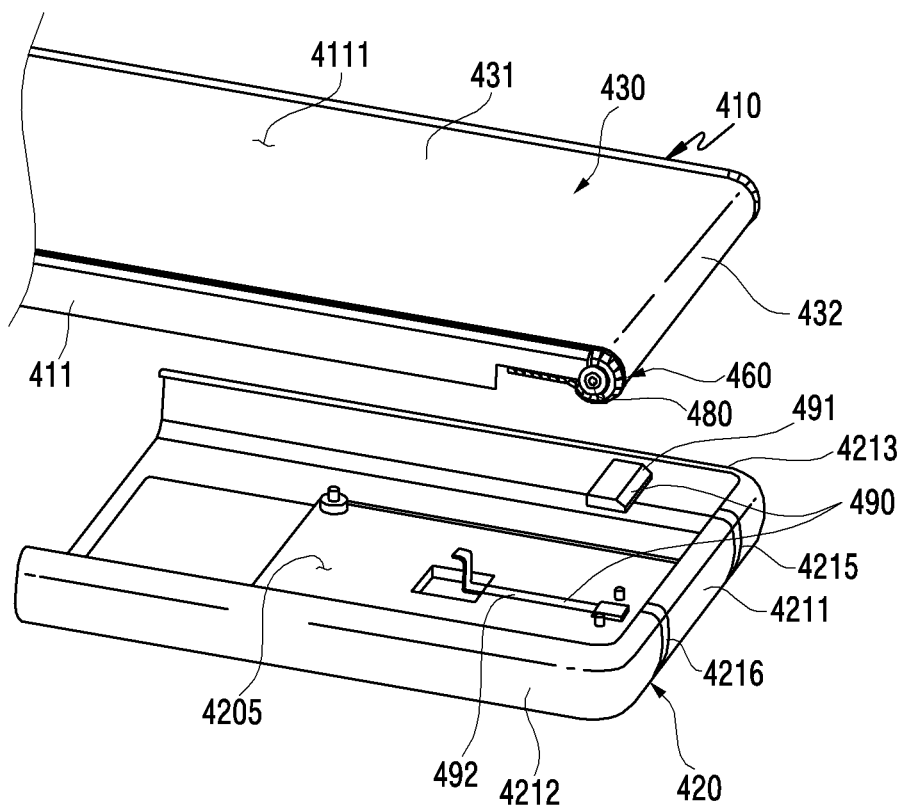

In operation 1015, referring to FIG. 11H, the conductive construction 490 may be assembled to the second plate 421 of the second construction 420. According to an embodiment, the dummy portion 491 may be fixed to the conductive member disposed inside the trough 4205 constructed by the first lateral wall 4211, second lateral wall 4212, and third lateral wall 4213 of the second plate 421, and the electrical coupling member 492 (e.g., FPCB) extended to be pulled out by a specific length from the dummy portion 491 may be disposed.

Figure 11I:
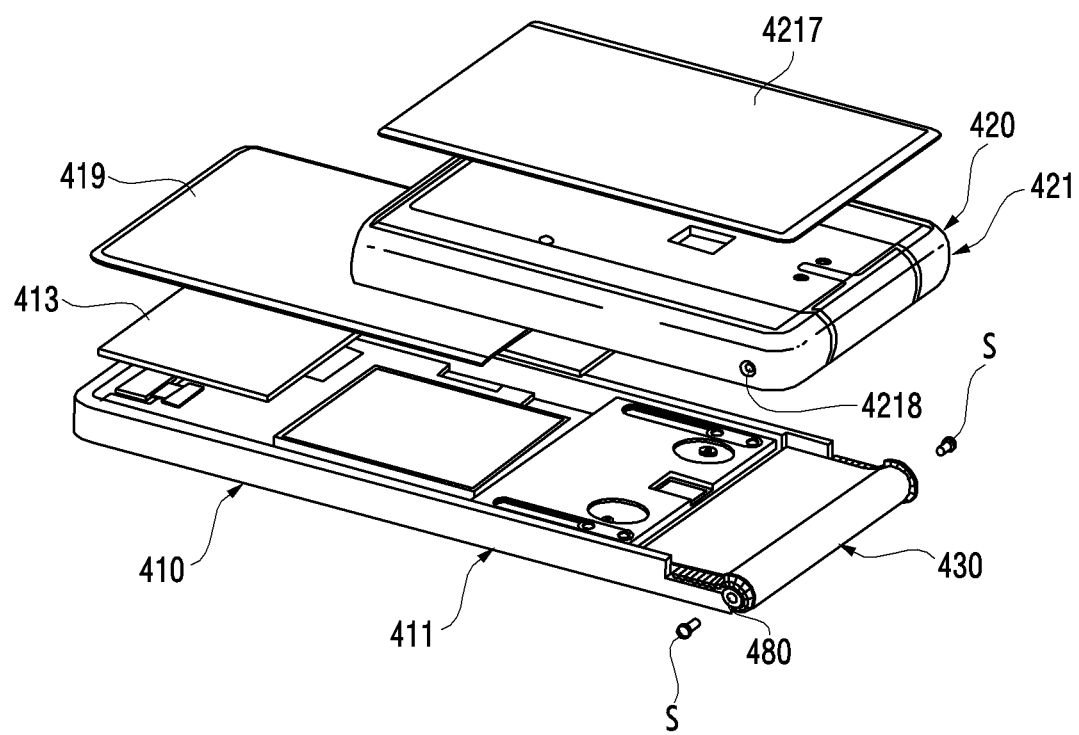

In operation 1017, referring to FIG. 11I, the second construction 420 may be assembled to the first construction 410. In this case, the electrical coupling member 492 of the conductive construction 490 may be electrically coupled to a sub PCB (e.g. the sub PCB 447 of FIG. 4) disposed between the first supporting member (e.g., the first supporting member 440 of FIG. 4) and the second supporting member (e.g., the second supporting member 450 of FIG. 4). The supporting cover 413 and the first rear cover 419 may be assembled to the first plate 411. The second rear cover 4217 may be assembled to the second plate 421. Thereafter, assembling may be complete by joining a screw S to the shaft 480 via the screw joining hole 4218 disposed to the second plate 421.

Figure 12:
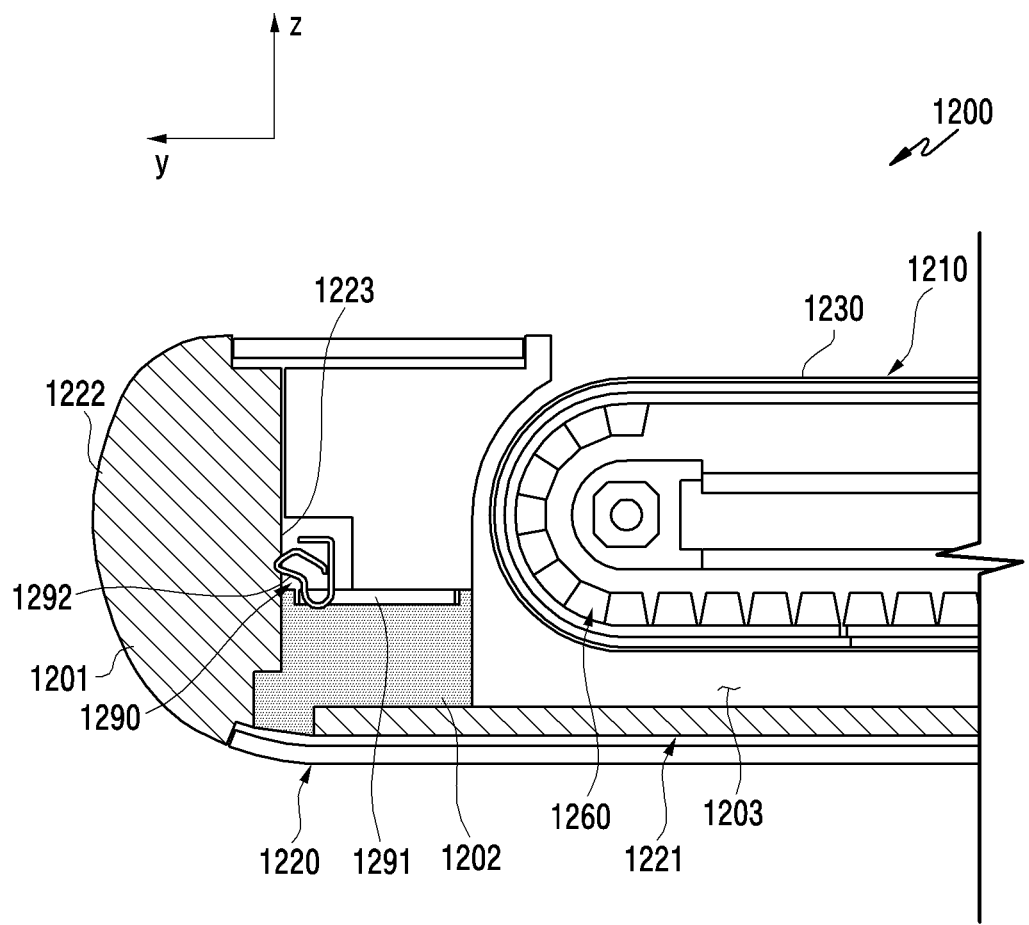
FIG. 12 and FIG. 13 are cross-sectional views illustrating an example electronic device having a conductive construction (assembly) disposed thereto according to various embodiments of the present disclosure.
Figure 13:
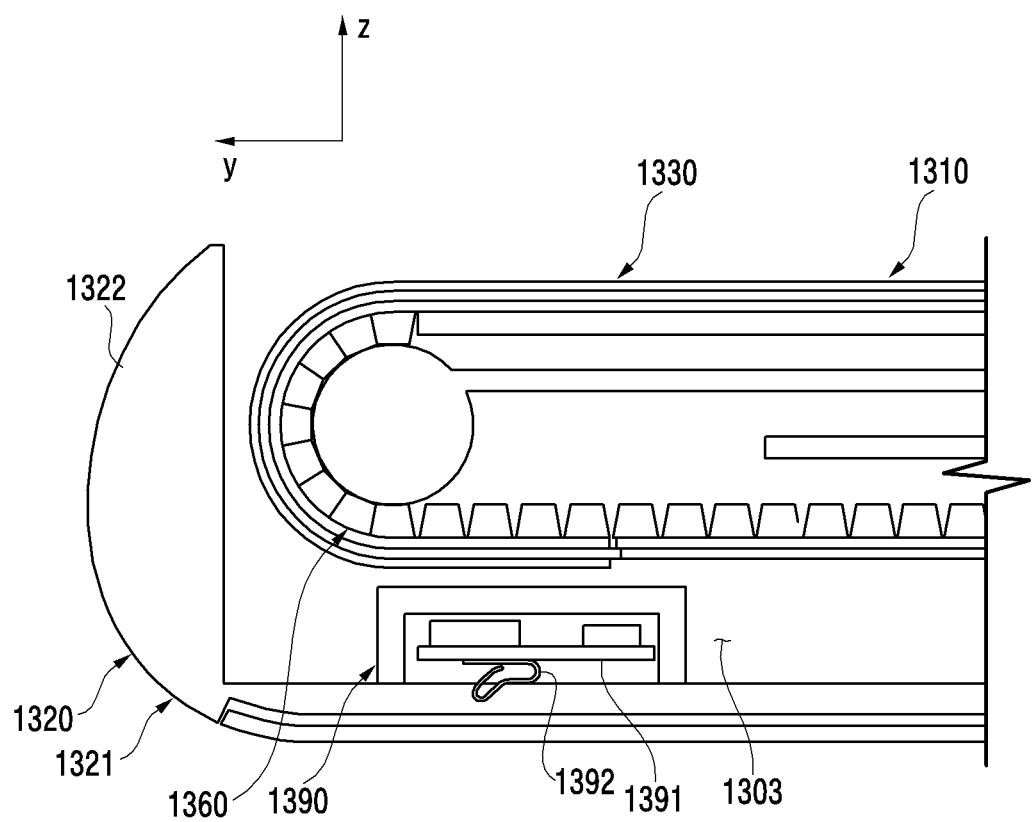

FIG. 12 and FIG. 13 are cross-sectional views illustrating an example electronic device having a conductive construction disposed thereto according to various embodiments of the present disclosure.

Referring to FIG. 12, an electronic device 1200 may include a first construction 1210 and a second construction 1220 coupled movably to the first construction 1210. According to an embodiment, the first construction 1210 may be disposed movably with respect to the second construction 1220. According to an embodiment, the first construction 1210 may include a display 1230 supported by a supporting construction (support) 1260 and disposed such that at least part thereof can be extended. According to an embodiment, the second construction 1220 may include a second plate 1221 and a first lateral wall 1222. According to an embodiment, the second plate 1221 may be constructed in such a manner that at least part of a conductive member 1201 and non-conductive member 1202 may, for example, be insert-injected. However, without being limited thereto, the second plate 1221 may be constructed in such a manner that the non-conductive member 1202 is structurally coupled to the conductive member 1201. According to an embodiment, the second plate 1221 may include a conductive construction 1290 disposed inside thereof. According to an embodiment, the conductive construction 1290 may include a conductive connector 1292 mounted to a board 1291 and physically in contact with an interior surface 1223 constructed as the conductive member 1202 exposed towards the inside of the electronic device 1200 from the first lateral wall 1222 of the second plate 1221.

In an example embodiment of the present disclosure, the conductive construction 1290 may be disposed to have a structure of a contact point in a Y-axis direction. In this case, since a space 1203 between the supporting construction 1260 and the second plate 1221 can be decreased to the maximum extent possible, a thickness of the electronic device 1200 can be decreased.

Referring to FIG. 13, an electronic device 1300 may include a first construction 1310 and a second construction 1320 coupled movably to the first construction 1310. According to an embodiment, the first construction 1310 may be disposed movably with respect to the second construction 1320. According to an embodiment, the first construction 1310 may include a display 1330 supported by a supporting construction 1360 and disposed such that at least part thereof can be extended. According to an embodiment, the second construction 1320 may include a second plate 1321 and a first lateral wall 1322. According to an embodiment, the second plate 1321 may be constructed as a conductive member. According to an embodiment, the second plate 1321 may include a conductive construction 1390 disposed inside thereof. According to an embodiment, the conductive construction 1390 may include a conductive connector 1392 mounted to a board 1391 and physically in contact with the second plate 1321.

According to various embodiments, the supporting construction (support) 1360 may be substantially constructed as planar portions except for a curved portion which allows at least part of the display 1330 to be inserted inside the electronic device 1300. According to an embodiment, the conductive construction 1390 may be disposed to have a structure of a contact point of a Z-axis direction in a space 1303 between the planar portion of the supporting construction 1360 and the second plate 1321.

According to various embodiments, an electronic device (e.g., the electronic device 400 of FIG. 4) may include: a first assembly (e.g., the first construction 410 of FIG. 4) comprising a first plate (e.g., the first plate 411 of FIG. 4) having a first face (e.g., the first face 4111 of FIG. 4) and a second face (e.g., the second face 4112 of FIG. 4) facing away from the first face (e.g., the first face 4111 of FIG. 4); a second assembly (e.g., the second construction 420 of FIG. 4) comprising a second plate (e.g., the second plate 421 of FIG. 4) facing the second face of the first plate, a first lateral wall (e.g., the first lateral wall 4211 of FIG. 4) extending from a first end portion of the second plate, a second lateral wall (e.g., the second lateral wall 4212 of FIG. 4) extending from the first lateral wall and the second plate, and a third lateral wall (e.g., the third lateral wall 4213 of FIG. 3) extending from the first lateral wall and the second plate and parallel to the second lateral wall, wherein the second plate, the first lateral wall, the second lateral wall, and the third lateral wall together define a trough (e.g., the trough 4205 of FIG. 8B) having one side open to accommodate at least part of the first assembly, wherein the first assembly is movable with respect to the second assembly between an open state (e.g., the state of the electronic device 200 of FIG. 3) and a close state (e.g., the state of the electronic device 200 of FIG. 2A) in a first direction, and wherein the second assembly is located at a first distance (e.g., the first distance L1 of FIG. 2A) from the first lateral wall when the first assembly is in the closed state, and is located at a second distance (e.g., the second distance L2 of FIG. 3) greater than the first distance from the first lateral wall when the first assembly is in the open state; and a flexible touch screen display (e.g., the display 430 of FIG. 4). The flexible touchscreen display may include a planar portion (e.g., the planar portion 431 of FIG. 4) extending across at least part of the first face and mounted to the first face, and a bendable portion (e.g., the bendable portion 432 of FIG. 4) extending to a space between the first lateral wall and the first assembly from the planar portion or between the second plate and the second face of the first plate when the first assembly is in the closed state. When the first assembly (e.g., the first construction 410 of FIG. 4) transitions from the closed state to the open state, at least part of the bendable portion (e.g., the bendable portion 432 of FIG. 4) extending to the space may be moved to be visually exposed to the outside of the electronic device from the space to substantially define a plane between the planar portion (e.g., the planar portion 431 of FIG.) and the first lateral wall (e.g., the first lateral wall 4211 of FIG. 4). When the first assembly (e.g., the first construction 410 of FIG. 4) is in the closed state, the bendable portion (e.g., the bendable portion 432 of FIG. 4) may be bent along an axis extending in a second direction perpendicular to the first direction, a first portion (e.g., the first portion 4321 of FIG. 5) of the bendable portion may be disposed in a corresponding region of the space between the second plate and the second face of the first plate, and a second portion (e.g., the second portion 4322 of FIG. 5) of the bendable portion may be disposed between the axis (e.g., the axis 480 of FIG. 5) and the second plate (e.g., the second plate 421 of FIG. 5). A third distance (e.g., the third distance d3 of FIG. 5) between the second plate and the first portion may be greater than a fourth distance (e.g., the fourth distance d4 of FIG. 5) between the second plate and the second portion.

According to various embodiments, the electronic device may further include a shaft (e.g., the shaft 480 of FIG. 4) disposed inside the trough (e.g., the trough 4205 of FIG. 8B), coupled to the second assembly (e.g., the second construction 420 of FIG. 4), and extending in the second direction (e.g., the direction ②of FIG. 4) perpendicular to the first direction (e.g., the direction ①of FIG. 4)) to define the axis, and a supporting assembly (e.g., the supporting construction 460 of FIG. 4) which can be bendably extended and which is coupled to a peripheral portion of the first assembly (e.g., the first construction 410 of FIG. 4) in the vicinity of the first lateral wall (e.g., the first lateral wall 4211 of FIG. 4). The supporting construction which can be bendably extended may be extended into the space in the closed state to surround the shaft. When the first assembly transitions from the closed state to the open state, at least part of the supporting assembly which can be bendably extended may be moved to a space between the first lateral wall and the first construction or between the second place and the second face of the first plate so as to substantially define a plane between the first assembly and the first lateral wall. The bendable portion (e.g., the bendable portion 432 of FIG. 4) of the display (e.g., the display 430 of FIG. 4) may be coupled to the supporting assembly which can be bendably extended.

According to various embodiments, the supporting assemblies (e.g., the supporting constructions 460 of FIG. 4) which can be bendably extended may be coupled to be parallel to each other, and may include a bar (e.g., the bar 461 of FIG. 4) extending in the second direction.

According to various embodiments, the electronic device may further include a guide assembly (e.g., the guide construction 446 of FIG. 6A) comprising a guide configured to guide the supporting construction (e.g., the supporting construction 460 of FIG. 4) which can be bendably extended in order to provide the fourth distance (e.g., the fourth distance d4 of FIG. 5).

According to various embodiments, the guide assembly (e.g., the guide construction 446 of FIG. 6A) may be disposed between the first plate (e.g., the first plate 411 of FIG. 4) and the supporting assembly (e.g., the supporting construction 460 of FIG. 4) which can be bendably extended.

According to various embodiments, the electronic device may further include a conductive assembly (e.g., the conductive construction 490 of FIG. 5) disposed inside a space between the first portion (e.g., the first portion 4321 of FIG. 5) and the second plate (e.g., the second plate 421 of FIG. 5).

According to various embodiments, the electronic device may further include a wireless communication circuit (e.g., the wireless communication circuit 4121 of FIG. 5) electrically coupled to the conductive assembly (e.g., the conductive construction 490 of FIG. 5).

According to various embodiments, the electronic device may further include a first support (e.g., the first supporting member 440 of FIG. 4) disposed between the second face (e.g., the second face 4112 of FIG. 4) and the second plate (e.g., the second plate 421 of FIG. 4), and a second support (e.g., the second supporting member 450 of FIG. 4) disposed between the first supporting member and the second face and coupled to the first support. The shaft (e.g., the shaft 480 of FIG. 4) may be coupled to penetrate at least part of the first support and the second support.

According to various embodiments, the electronic device may further include a screw joining hole (e.g., the screw joining hole 481 of FIG. 9) disposed at both end portions of the shaft (e.g., the shaft 480 of FIG. 9). The shaft may be fixed to the second plate (e.g., the second plate 421 of FIG. 8C) by means of a screw (e.g., the screw S of FIG. 9) to be joined to the screw joining hole via a screw through-hole (e.g., the screw through-hole 4218 of FIG. 8C) disposed to the first lateral wall and the second lateral wall.

According to various embodiments, the shaft (e.g., the shaft 480 of FIG. 9) may comprise a conductive material, and may be electrically coupled to the second plate as a conductive member by means of the conductive screw (e.g., the screw S of FIG. 9).

According to various embodiments, the first support (e.g., the first supporting member 440 of FIG. 4) may include a first planar portion (e.g., the first planar portion 441 of FIG. 4), a second planar portion (e.g., the second planar portion 442 of FIG. 4) extending from the first planar portion and disposed to be closer to the second plate (e.g., the second plate 421 of FIG. 4) than the first planar portion, and at least one side hinge arm (e.g., the side hinge arms 443 and 444 of FIG. 4) provided in the first planar portion along the axis direction and including a through-hole (e.g., the through-holes 4431 and 4441 of FIG. 4). The second support (e.g., the second supporting member 450 of FIG. 4) may include a third planar portion (e.g., the third planar portion 451 of FIG. 4) provided to at least partially overlap with the first planar portion and the second planar portion, and at least one center hinge arm (e.g., the sensor hinge arm 452 of FIG. 4) provided in the third planar portion along the axis direction, in a shape of being aligned in parallel to the at least one side hinge arm, and including a through-hole (i.e., the through-hole 4521 of FIG. 4). The shaft (e.g., the shaft 480 of FIG. 4) may be disposed to penetrate the through-hole of the side hinge arm and the through-hole of the center hinge arm.

According to various embodiments, the electronic device may further include a sub PCB (e.g., the sub PCB 447 of FIG. 4) disposed to a space between the second planar portion (e.g., the second planar portion 442 of FIG. 4) and the third planar portion (e.g., the third planar portion 451 of FIG. 4). The sub PCB may be electrically coupled to a conductive assembly (e.g., the conductive construction 490 of FIG. 4) disposed inside a trough of the second plate (e.g., the second plate 421 of FIG. 4).

According to various embodiments, the sub PCB (e.g., the sub PCB 447 of FIG. 4) may be electrically coupled to a PCB (e.g., the PCB 412 of FIG. 4) disposed inside the first assembly (e.g., the first construction 410 of FIG. 4).

According to various embodiments, the electronic device may include a bar support (e.g., the bar supporting member 470 of FIG. 4) disposed between the first support (e.g., the first supporting member 440 of FIG. 4) and the second plate (e.g., the second plate 421 of FIG. 4). The bar support may include a fourth planar portion (e.g., the fourth planar portion 471 of FIG. 4) disposed at a location corresponding to the first planar portion (e.g., the first planar portion 441 of FIG. 4), and a fifth planar portion (e.g., the fifth planar portion 472 of FIG. 4) extending from the fourth planar portion. At least part of the bendable portion (e.g., the bendable portion 432 of FIG. 4) of the display (e.g., the display 430 of FIG. 4) may be fixed to the fourth planar portion. The bar support may be moved with respect to the first supporting member in response to a movement of the first assembly (e.g., the first construction 410 of FIG. 4)

According to various embodiments, the supports (e.g., the supporting constructions 460 of FIG. 4) which can be bendably extended may be coupled to be parallel to each other and comprise a bar (e.g., the bar 461 of FIG. 4) extending in the second direction. The bar may be disposed along an outer circumferential surface of the side hinge arm (e.g., the side hinge arms 443 and 444 of FIG. 4) and center hinge arm (e.g., the center hinge arm 452 of FIG. 4).

According to various embodiments, the electronic device may further include a guide (e.g., the guide construction 446 of FIG. 6A) configured to guide the support (e.g., the supporting construction 460 of FIG. 4) which can be bendably extended in order to provide the fourth distance (e.g., the fourth distance d4 of FIG. 5). The guide may include a guide groove (e.g., the guide groove 4462 of FIG. 6C) extending from an outer circumferential surface of the side hinge arm (e.g., the side hinge arms 443 and 444 of FIG. 6A) of the first support (e.g., the first supporting member 440 of FIG. 6A) to up to at least part of the first planar portion (e.g., the first planar portion 441 of FIG. 6A), and at least one guide protrusion (e.g., the guide protrusion 4611 of FIG. 6D) disposed to protrude from the bar so as to be guided by the guide groove. The bar may be coupled to the first support (e.g., the first supporting member 440 of FIG. 6D) in such a manner that the guide protrusion is guided by the guide groove.

According to various embodiments, the electronic device may further include a conductive assembly (e.g., the conductive construction 490 of FIG. 5) disposed inside the second space (e.g., the second space 4102 of FIG. 5) between the first portion (e.g., the first portion 4321 of FIG. 5) and the second plate (e.g., the second plate 421 of FIG. 5). At least part of the second plate (e.g., the second plate 421 of FIG. 5) may be constructed as a conductive member. The conductive assembly may be electrically coupled to the conductive member.

According to various embodiments, an electronic device (e.g., the electronic device 400 of FIG. 4) may include a first assembly (e.g., the first construction 410 of FIG. 4) which provides at least part of a rear face (e.g., the second face 2112 of FIG. 2A) of the electronic device, a second assembly (e.g., the second construction 420 of FIG. 4) at least partially accommodated by the first assembly and movable with respect to the rear face, and a flexible touchscreen display (e.g., the display 430 of FIG. 4) at least partially accommodated by the first assembly, and coupled to the second assembly so that a size of a display region visually exposed to the outside in a direction of a front face of the electronic device is adjustable in response to a relative movement of the second assembly with respect to the first assembly. The flexible touchscreen display may include a flat display region (e.g., the planar portion 431 of FIG. 4) visually exposed to the outside, and a bendable display region (e.g., the bendable portion 432 of FIG. 4) exposed visually to the outside by being extended from an inner space of the first assembly when the second assembly is moved in a first direction relative to the first assembly, and not exposed visually when retracted to the inner space when the second assembly is moved in a second direction opposite to the first direction relative to the first assembly. A first portion (e.g., the first portion 4101 of FIG. 5) of the bendable display region may be substantially parallel to the flat display region, and when the second portion (e.g., the second portion 4102 of FIG. 5) is retracted to the inner space so as to be bent with respect to the flat display region, a first minimum distance (e.g., the third distance d3 of FIG. 5) between the first portion and an interior surface of the rear face is greater than a second minimum distance (e.g., the fourth distance d4 of FIG. 5) between the second portion and the interior surface.

According to various embodiments, the electronic device may further include a conductive assembly (e.g., the conductive construction 490 of FIG. 5) disposed inside the inner space (e.g., the second space 4202 of FIG. 5). At least part of the first assembly (e.g., the first construction 410 of FIG. 5) may be constructed as a conductive member. The conductive assembly may be electrically coupled to the conductive member.

According to various embodiments, the electronic device may further include a wireless communication circuit (e.g., the wireless communication circuit 4121 of FIG. 5) electrically coupled to the conductive construction (e.g., the conductive construction 490 of FIG. 5).

While the present disclosure has been illustrated and described with reference to various example embodiments thereof, it is to be understood that the various examples described herein are intended to be illustrative, not limiting. One skilled in the art will understand that various changes in form and detail may be made without departing from the true spirit and full scope of the disclosure, as defined, for example, in the appended claims and their equivalents.

What is claimed is:

1. An electronic device comprising:
a first assembly comprising a first plate having a first face and a second face facing away from the first face;
a second assembly comprising a second plate facing the second face of the first plate, a first lateral wall extending from a first end portion of the second plate, a second lateral wall extending from the first lateral wall and the second plate, and a third lateral wall extending from the first lateral wall and the second plate and being parallel to the second lateral wall,
wherein the second plate, the first lateral wall, the second lateral wall, and the third lateral wall together define a trough having one side open to accommodate at least part of the first assembly,
wherein the first assembly is configured to be movable between an open state and a closed state with respect to the second assembly in a first direction, and
wherein the first assembly is configured to be located at a first distance from the first lateral wall of the second assembly when the first assembly is in the closed state, and to be located at a second distance greater than the first distance from the first lateral wall of the second assembly when the first assembly is in the open state; and
a flexible touchscreen display, wherein the flexible touchscreen display comprises:
a planar portion extending across at least part of the first face and mounted to the first face; and
a bendable portion extending from the planar portion to a space between the first lateral wall and the first assembly and/or between the second plate and the second face of the first plate when the first assembly is in the closed state,
wherein at least part of the bendable portion extending to the space is configured to be moved from the space to be visually viewable by a viewer from the outside of the electronic device, to define a plane between the planar portion and the first lateral wall when the first assembly transitions from the closed state to the open state,
wherein, when the first assembly is in the closed state, the bendable portion is bent around an axis extending in a second direction perpendicular to the first direction, a first portion of the bendable portion is inserted to a corresponding region of the space between the second plate and the second face of the first plate, and a second portion of the bendable portion is disposed between the axis and the second plate, and
wherein a third distance between the second plate and the first portion of the flexible touchscreen display is greater than a fourth distance between the second plate and the second portion of the flexible touchscreen display.

2. The electronic device of claim 1, further comprising:
a shaft disposed inside the trough, coupled to the second assembly, and extending in the second direction perpendicular to the first direction to define the axis; and
a supporting assembly configured to be bendably extended and being coupled to a peripheral portion of the first assembly within a specified distance of the first lateral wall, the supporting assembly comprising a planar portion and a bent portion at least partially around the shaft in the closed state, wherein the supporting assembly is configured to extend into the space in the closed state to surround the shaft,
wherein at least part of the supporting assembly is moved to the space between the first lateral wall and the first assembly or between the second place and the second face of the first plate to define a plane between the first assembly and the first lateral wall when the first construction transitions from the closed state to the open state, and
wherein the bendable portion of the display is coupled to the supporting assembly.

3. The electronic device of claim 2, wherein the supporting assembly comprises a bar extending in the second direction.

4. The electronic device of claim 2, further comprising a guide configured to guide the supporting assembly.

5. The electronic device of claim 4, wherein the guide is disposed between the first plate and the supporting assembly.

6. The electronic device of claim 2, further comprising:
a first support disposed between the second face and the second plate; and
a second support disposed between the first support and the second face and coupled to the first support,
wherein the shaft is coupled to penetrate at least part of the first support and the second support.

7. The electronic device of claim 6, wherein the first support comprises:
a first planar portion;
a second planar portion extending from the first planar portion; and
at least one side hinge arm disposed in the first planar portion along the axis direction and comprising a through-hole,
wherein the second support comprises:
a third planar portion at least partially overlapping with the first planar portion and the second planar portion; and
at least one center hinge arm disposed in the third planar portion along the axis direction, aligned in parallel to the at least one side hinge arm, and comprising a through-hole,
wherein the shaft is disposed to penetrate the through-hole of the side hinge arm and the through-hole of the center hinge arm.

8. The electronic device of claim 7, further comprising a sub PCB disposed in a space between the second planar portion and the third planar portion,
wherein the sub PCB is electrically coupled to a conductive assembly disposed inside a trough of the second plate.

9. The electronic device of claim 8, wherein the sub PCB is electrically coupled to a PCB disposed inside the first assembly.

10. The electronic device of claim 7, further comprising a bar support disposed between the first support and the second plate, wherein the bar support comprises:
a fourth planar portion disposed at a location corresponding to the first planar portion; and
a fifth planar portion extending from the fourth planar portion,
wherein at least part of the bendable portion of the display is fixed to the fourth planar portion, and
wherein the bar support is configured to move with respect to the first supporting member in response to a movement of the first assembly.

11. The electronic device of claim 7,
wherein the first and second supports are coupled parallel to each other and comprise a bar extending in the second direction, and
wherein the bar is disposed along an outer circumferential surface of the side hinge arm and center hinge arm.

12. The electronic device of claim 11, further comprising a guide, wherein the guide comprises:
   a guide groove extending from an outer circumferential surface of the side hinge arm of the first support to up to at least part of the first planar portion; and
   at least one guide protrusion protruding from the bar and configured to be guided by the guide groove,
   wherein the bar is coupled to the first support so that the guide protrusion is guided by the guide groove.

13. The electronic device of claim 1, further comprising a conductive assembly comprising a conductive material disposed between the first portion and the second plate.

14. The electronic device of claim 13, further comprising a wireless communication circuit electrically coupled to the conductive assembly.

15. The electronic device of claim 2, further comprising a screw joining hole disposed at end portions of the shaft,
   wherein the shaft is fixed to the second plate by a screw joined to the screw joining hole via a screw throughhole disposed in the first lateral wall and the second lateral wall.

16. The electronic device of claim 2, wherein the shaft comprises a conductive material, and is electrically coupled to the second plate by the conductive screw.

17. The electronic device of claim 1, further comprising a conductive assembly disposed between the first portion and the second plate,
   wherein at least part of the second plate includes the conductive assembly, and
   wherein the conductive assembly is electrically coupled to the conductive member.

18. An electronic device comprising:
   a first assembly, comprising a first plate, forming at least part of a rear face of the electronic device;
   a second assembly, comprising a second plate, at least partially accommodated by the first assembly and movable with respect to the rear face; and
   a flexible touchscreen display at least partially accommodated by the first assembly, and coupled to the second assembly so that a size of a display region visually exposed to the outside in a direction of a front face of the electronic device is adjustable in response to a movement of the second assembly, wherein the flexible touchscreen display comprises:
   a flat display region visually exposed to the outside; and
   a bendable display region exposed visually to the outside by being extended from an inner space defined by the first assembly when the second assembly is moved in a first direction, and not exposed visually when retracted to the inner space when the second assembly is moved in a second direction opposite to the first direction,
   wherein a first portion of the bendable display region is parallel to the flat display region when the bendable display region is extended, and
   when a second portion of the bendable display region is retracted to the inner space when the bendable display region is bent with respect to the flat display region, a first minimum distance between the first portion and an interior surface of the rear face is greater than a second minimum distance between the second portion and the interior surface.

19. The electronic device of claim 18, further comprising a conductive assembly disposed inside the inner space,
   wherein at least part of the first assembly comprises a conductive member comprising a conductive material, and
   wherein the conductive assembly is electrically coupled to the conductive member.

20. The electronic device of claim 19, further comprising a wireless communication circuit electrically coupled to the conductive assembly.

* * * * *